United States Patent
Lim et al.

(10) Patent No.: US 10,440,554 B2
(45) Date of Patent: Oct. 8, 2019

(54) METHOD AND APPARATUS FOR RECEIVING A CONTINUOUS MOBILE TERMINATED SERVICE IN A COMMUNICATION SYSTEM

(71) Applicant: Samsung Electronics Co., Ltd., Gyeonggi-do (KR)

(72) Inventors: Han-Na Lim, Seoul (KR); Jung-Shin Park, Seoul (KR); Joo-Hyung Lee, Bucheon-si (KR); Jin-Sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/537,864

(22) PCT Filed: Dec. 17, 2015

(86) PCT No.: PCT/KR2015/013867
§ 371 (c)(1),
(2) Date: Aug. 29, 2017

(87) PCT Pub. No.: WO2016/099174
PCT Pub. Date: Jun. 23, 2016

(65) Prior Publication Data
US 2017/0353849 A1    Dec. 7, 2017

(30) Foreign Application Priority Data

Dec. 17, 2014   (KR) .................... 10-2014-0182371

(51) Int. Cl.
*H04W 8/00*       (2009.01)
*H04W 8/02*       (2009.01)
(Continued)

(52) U.S. Cl.
CPC ............ *H04W 8/02* (2013.01); *H04W 60/04* (2013.01); *H04W 60/005* (2013.01)

(58) Field of Classification Search
CPC ...... H04W 8/02; H04W 60/04; H04W 60/005
See application file for complete search history.

(56) References Cited

U.S. PATENT DOCUMENTS

2004/0066759 A1*   4/2004   Molteni .............. H04L 41/048
                                                      370/329
2009/0016282 A1*   1/2009   Gasparroni ........... H04L 45/24
                                                      370/329
(Continued)

FOREIGN PATENT DOCUMENTS

KR       1020140054773 A    5/2014
WO          2014010787 A1   1/2014
WO          2014069927 A1   5/2014

OTHER PUBLICATIONS

International Search Report dated Mar. 24, 2016 in connection with International Patent Application No. PCT/KR2015/013867.

(Continued)

*Primary Examiner* — Pakee Fang

(57) ABSTRACT

The present disclosure relates to a 5G or a pre-5G communication system to be provided in order to support a higher data transmission rate than a 4G communication system such as LTE. The present invention provides a method for receiving, by a terminal, a mobile end service in a communication system, the method including: a step of ascertaining whether there exists a continuously available service among services which have been provided from a serving base station, on the basis of a list of supported services received from a target base station; and in the case that there exists a continuously available service, a step of transmitting a (Continued)

service area update request to the target base station via a connection layer if the continuously available service supports a mobile end service.

12 Claims, 20 Drawing Sheets

(51) Int. Cl.
  *H04W 60/04*  (2009.01)
  *H04W 60/00*  (2009.01)

(56) References Cited

U.S. PATENT DOCUMENTS

| | | |
|---|---|---|
| 2010/0303041 A1 | 12/2010 | Diachina et al. |
| 2011/0122817 A1 | 5/2011 | Russell et al. |
| 2011/0305184 A1 | 12/2011 | Hsu |
| 2013/0051338 A1 | 2/2013 | Ryu et al. |
| 2013/0150024 A1 | 6/2013 | Burbidge et al. |
| 2014/0243038 A1 | 8/2014 | Schmidt et al. |
| 2014/0259012 A1* | 9/2014 | Nandlall .............. H04W 8/02 718/1 |
| 2015/0133116 A1* | 5/2015 | Lauer .................. H04W 12/06 455/435.1 |
| 2015/0296557 A1 | 10/2015 | Kim et al. |
| 2016/0007399 A1* | 1/2016 | Lim ..................... H04L 69/321 370/329 |
| 2017/0188252 A1* | 6/2017 | Miao .................... H04W 36/06 |
| 2017/0245310 A1 | 8/2017 | Chandramouli et al. |

OTHER PUBLICATIONS

Written Opinion of the International Searching Authority dated Mar. 24, 2016 in connection with International Patent Application No. PCT/KR2015/013867.

Supplementary European Search Report dated Mar. 14, 2018 in connection with European Patent Application No. 15 87 0341.

European Patent Office, "Supplementary Partial European Search Report," Application No. EP 15870341.3, dated Dec. 21, 2017, 5 pages.

* cited by examiner

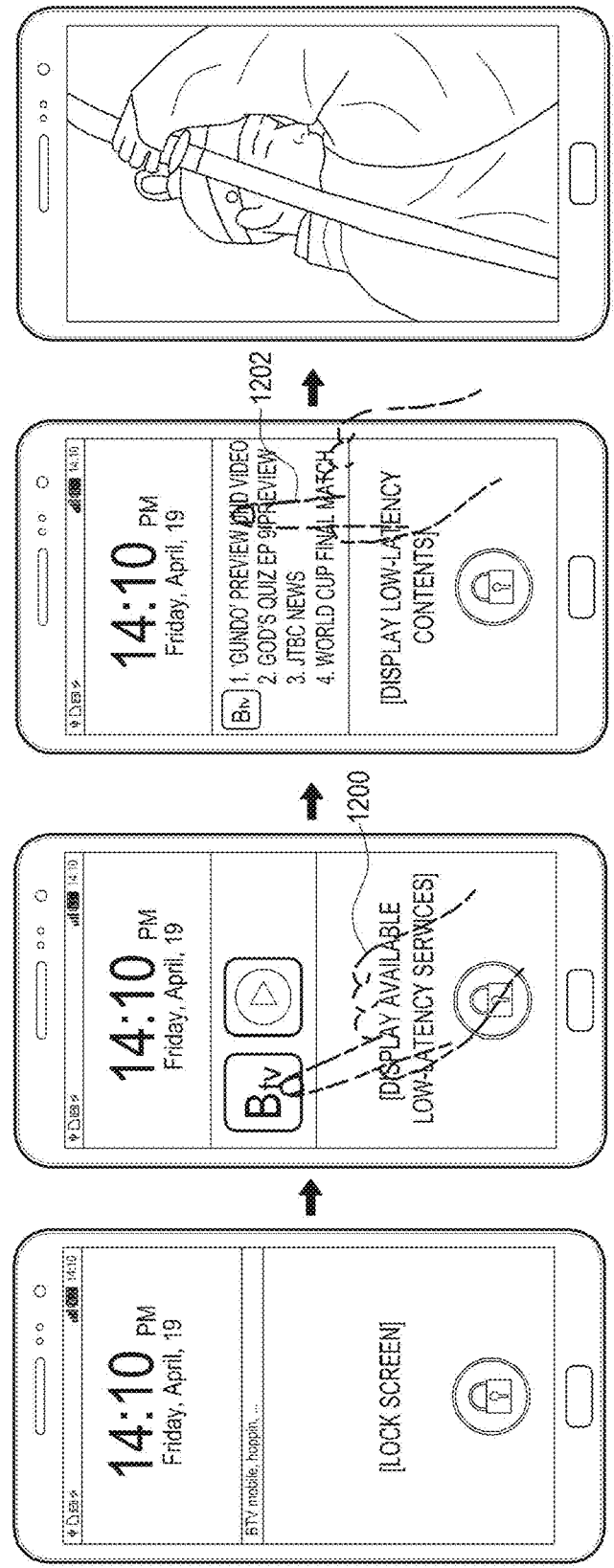

METHOD AND APPARATUS FOR RECEIVING A CONTINUOUS MOBILE TERMINATED SERVICE IN A COMMUNICATION SYSTEM

CROSS-REFERENCE TO RELATED APPLICATION(S)

This application is a National Phase Entry of PCT International Application No. PCT/KR2015/013867, which was filed on Dec. 17, 2015, and claims priority to Korean Patent Application No. 10-2014-0182371, which was filed in the Korean Intellectual Property Office on Dec. 17, 2014, the entire content of each of which is incorporated by reference.

TECHNICAL FIELD

The present disclosure relates to a method and apparatus for receiving a mobile terminated (MT) service by a mobile terminal in an idle mode in a communication system.

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed. In a next-generation mobile communication system, communication technologies and services are under discussion, which support a data capacity that is about 1000 times larger than conventional communication systems, e.g., an LTE system, support a speed of 1 Gbps or higher per individual, and support high-density networking. In line with this, research has been conducted on techniques for providing ultra-realistic, participating, and customized contents that maximize immersion and realism by applying virtual reality, holograms, four-dimension (4D) techniques, etc. To provide such contents, minimization of latencies occurring in a communication system is a big issue, in which the latencies may vary with an air condition, a backhaul structure, a distance between servers, and so forth.

Thus, various schemes for satisfying a latency level required in the next-generation mobile communication system have been studied, one of which is a system where a server for providing a service to a terminal and a base station (BS) are directly connected to each other to reduce a connection latency, referred to as a delay or a latency, occurring between the terminal and the server.

SUMMARY

The present disclosure provides a method and apparatus for receiving a mobile terminated (MT) service by a mobile terminal that enters an idle mode in a communication system.

According to an embodiment of the present disclosure, a method for receiving a mobile terminated (MT) service by a user equipment (UE) in a communication system includes determining based on a support service list received from a target base station (BS) whether a continuously available service exists among services provided from a serving BS and sending a service area update (SAU) request to the target BS through an access layer, if the continuously available service supports the MT service when the continuously available service exists.

According to another embodiment of the present disclosure, a method for providing an MT service to a UE by a BS in a communication system includes determining whether a context of the UE exists, upon receiving an SAU request from the UE through an access layer, obtaining the context of the UE, if the context of the UE does not exist, and configuring a core bearer with a low-latency BS server that provides a service, if determining based on the context of the UE that the service to be provided to the UE supports the MT service.

According to an embodiment of the present disclosure, a UE for receiving an MT service in a communication system includes a controller configured to determine based on a support service list received from a target BS whether a continuously available service exists among services provided from a serving BS, and a transmitter configured to send an SAU request to the target BS through an access layer, if the continuously available service supports the MT service when the continuously available service exists.

According to another embodiment of the present disclosure, a BS for providing an MT service to a UE in a communication system includes a controller configured to determine whether a context of the UE exists if a receiver receives an SAU request from the UE through an access layer, obtaining the context of the UE, if the context of the UE does not exist, and a controller configured to control a context manager to obtain the context of the UE from a previous serving BS of the UE if the context of the UE does not exist, and to configure a core bearer with a low-latency BS server that provides a service, if determining based on the context of the UE that the service to be provided to the UE supports the MT service.

When a new low-latency BS located in a region to which a low-latency UE according to an embodiment of the present disclosure moves supports a low-latency service being used (on-going low-latency service) by the low-latency UE and the on-going low-latency service supports an MT service, the low-latency UE performs SAU of performing location registration in the new low-latency BS, thereby reducing a location registration procedure the low-latency UE has to unnecessarily perform for every movement. In addition, when receiving an SAU request according to an embodiment of the present disclosure from the low-latency UE, the low-latency BS configures an F2 bearer only with a low-latency BS server that supports a low-latency service available to the low-latency UE, which supports an MT service (that is, an 'MT support service'), among servers connected with the low-latency BS, thus reducing the waste of resources caused by unnecessary F2 bearer configuration. Moreover, according to an embodiment of the present disclosure, after a moving low-latency UE enters an idle mode, the low-latency UE performs SAU only when location registration is performed in case of satisfaction with predetermined conditions, differently from existing location registration, such that the low-latency BS to which the low-latency UE is newly attached may provide an MT signal of the low-latency service to the low-latency UE without connecting to a particular low-latency BS server.

BRIEF DESCRIPTION OF DRAWINGS

FIGS. 12A-D illustrate examples of a screen on which content corresponding to a user-selected low-latency service is executed according to an embodiment of the present disclosure.

DETAILED DESCRIPTION

Figure 1:
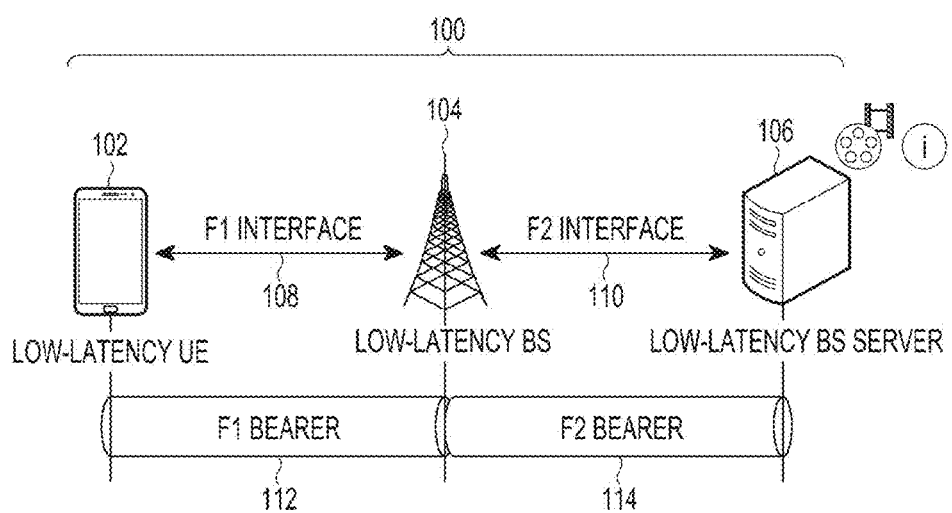
FIG. 1 illustrates an example of a low-latency system according to an embodiment of the present disclosure.

Hereinafter, the operating principles of exemplary embodiments of the present disclosure will be described with reference to the accompanying drawings. Like components are referred to as like reference numerals even through being illustrated in different drawings, and in the following description, a detailed description of related well-known functions or configurations will not be provided if it unnecessarily obscures the subject matter of the present disclosure. Further, the terminologies to be described below are defined in consideration of functions in the present disclosure and may vary depending on a user's or operator's intention or practice. Therefore, the definitions should be made based on the contents throughout the entire description of the present disclosure.

To provide a service to a terminal or a user equipment (UE) in a general communication system, a service connection setup process between the UE and a server for providing the service to the UE is required. In case of a communication system, for example, a Long Term Evolution (LTE) system, the service connection setup process is performed by separately performing a network connection process of the UE and a service connection process using a transport layer protocol, e.g., a transmission control protocol (TCP)/Internet protocol (IP). Thus, an embodiment of the present disclosure will be described based on a system for providing a service connection between a UE and a server in an access layer without using a transport layer protocol (hereinafter, a 'low-latency system') to provide a short delay or latency required in a $5^{th}$-generation (5G) communication system.

FIG. 1 illustrates an example of a low-latency system according to an embodiment of the present disclosure.

Referring to FIG. 1, a low-latency system 100 may include a UE that does not use a transport layer protocol (hereinafter, referred to as a 'low-latency UE') 102, a base station (BS) (hereinafter, referred to as a 'low-latency BS) 104, and a low-latency BS server 106.

The low-latency BS server 106 is directly connected with the low-latency BS 104, and provides a service that reduces a latency occurring due to the transport layer protocol (hereinafter, referred to as a 'low-latency service') to low-latency UEs connected through the BS 104, for example, the low-latency UE 100. In such a low-latency system, the low-latency BS server 106 may provide one or more low-latency services to the low-latency UEs. Herein, the low-latency BS server 106 uses a specialized protocol instead of an existing transport layer protocol. Thus, the low-latency BS server 106 reduces service connection latency in comparison to when using the transport layer protocol.

The low-latency UE 102 is connected to the low-latency BS server 106 through the low-latency BS 104 by using an access layer protocol, and is provided with one or more low-latency services provided from the low-latency BS server 106. Herein, the low-latency services may include a service specialized per mobile network operator (MNO), an Internet service provided by a content provider having a service level agreement (SLA) with the MNO, and so forth.

The low-latency BS 104 performs a function of service connection between a low-latency UE attached to the low-latency BS 104 using the access layer protocol and the low-latency BS server 106 directly connected with the low-latency BS 104, a function of management of a context of a low-latency UE (hereinafter, a 'low-latency context'), a function of F2 bearer configuration and update, and the like. The low-latency BS 104 transmits information related to a low-latency service provided by the low-latency BS 104 to the low-latency UE 102. The low-latency BS 104 forwards information related to a low-latency service supported by a neighboring BS to the low-latency UE 102. Transmission of the information related to a low-latency service supported by a neighboring BS may be used, for example, for a handover of the UE to the neighboring BS. To this end, the low-latency BS 104 may obtain in advance, from each neighboring BS, information related to low-latency services supported by the neighboring BS.

The low-latency BS 104 may support a plurality of attachment networks. For example, the low-latency BS 104 may support an LTE network, a 5G network, etc., and may be connected with the low-latency UE 102 through a different network for a different service.

In the low-latency system 100, to connect and register a low-latency UE to and in a low-latency network including a low-latency BS, an f1 interface 108 may be used, for example, between the low-latency UE 102 and the low-latency BS 104. In the low-latency system 100, to register a UE in a low-latency BS server, activate a low-latency service to allow providing of the low-latency service to the UE, perform updating of a low-latency context in the connected low-latency BS server, or release registration of a previously registered UE from the low-latency BS server, an f2 interface 110 may be used, for example, between the low-latency BS 104 and the low-latency BS server 106. A low-latency context according to an embodiment of the present disclosure may include T_UE_ID for identifying a low-latency UE in a low-latency system, F1 bearer ID, F1 level QoS, F2 bearer ID, a registered low-latency service name, session information, subscription data, and so forth. The subscription data may include, for example, a low-latency service name, a QoS of a low-latency service, and the like.

In the low-latency system 100, an F1 bearer 112 is provided as a radio bearer between the low-latency UE 102 and the low-latency BS 104, and an F2 bearer 114 is provided as a core bearer between the low-latency BS 104 and the low-latency BS server 106. In such a low-latency system, it is assumed that data transmission and reception of the low-latency UE 102 do not occur during a predetermined time. In this case, the low-latency BS 104 may release a radio resource of the low-latency UE 102 for resource saving. Thus, the low-latency UE 102 enters an idle mode. Thereafter, assuming that the low-latency UE 102, which has been provided with the low-latency service from the low-latency BS server 106, enters the idle mode and moves outside a coverage of the low-latency BS server 106, then the low-latency BS may not be aware of a location of the low-latency UE 102. In this situation, it is also assumed that the low-latency service provided by the low-latency BS server 106 supports a mobile terminated (MT) service and is to transmit an MT signal, which is a unidirectional signal, to the low-latency UE 102. In this case, the low-latency BS 104, because of being unaware of the location of the low-latency UE 102, may not be able to forward the MT signal of the low-latency BS server 106 to the low-latency UE 102. As a result, the low-latency UE 102 may experience stop of the service received through the low-latency BS server 102, degrading a quality of experience (QoE) of a user. Herein, the MT service is a service in which a web or a server sends a unidirectional signal or message to a mobile UE. The MT signal that may be generated in the MT service may include any type of messages and contents such as a receiving call generated in a real-time video conferencing scenario, a control signal sent by a UE to a vehicle in a vehicle wireless control scenario, data transmitted by an Internet of things (IoT) server to an IoT terminal, etc.

To prevent such situations, a low-latency UE in an idle mode has to notify its location when moving. In this case, low-latency services provided through a low-latency system are provided to a low-latency UE for each BS. Thus, the low-latency UE entering the idle mode has to register its location in each BS to which the low-latency UE is attached during movement.

Figure 2:
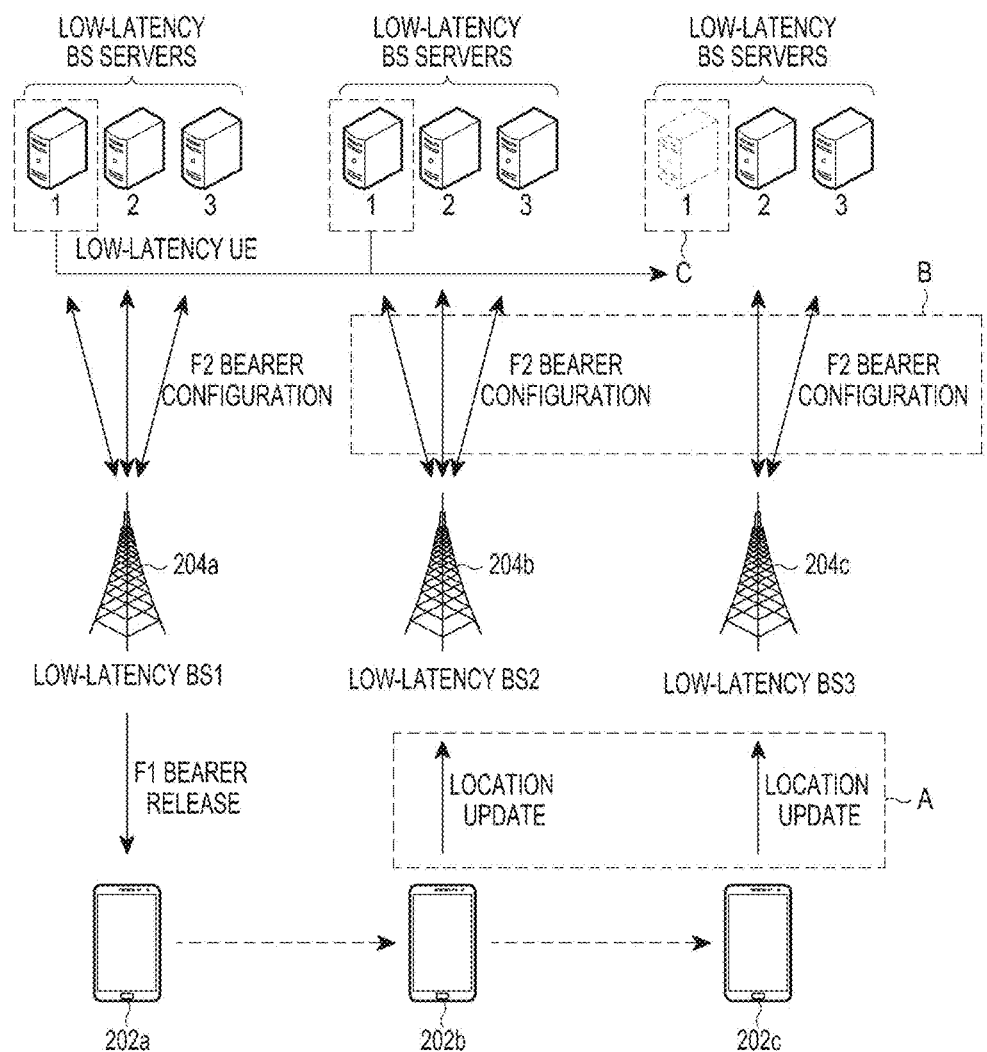
FIG. 2 illustrates an example of situations that may occur when location registration is performed for each base station to which a terminal or a user equipment (UE) is attached when moving in a low-latency system.

FIG. 2 illustrates an example of situations that may occur when location registration is performed for each BS to which a UE is attached when moving in a low-latency system.

Referring to FIG. 2, a low-latency UE 202*a* is provided with a low-latency service, through a low-latency BS1 204*a*, from low-latency BS servers connected with the low-latency BS1 204*a*. The low-latency BS1 204*a* configures an F2 bearer with the low-latency BS servers, and is assumed to provide, for example, three low-latency services, i.e., low-latency services 1 through 3. According to an embodiment, the low-latency BS servers may include physical servers corresponding to the respective low-latency services as shown in FIG. 2, or the low-latency services may be provided through a single server.

It is assumed that the low-latency UE 202*a* provided with the low-latency services 1 to 3 through the low-latency BS1 204*a* enters the idle mode. It is also assumed that as the low-latency UE 202*a* moves as indicated by 202*b*, the low-latency UE 202*a* enters a service coverage of a low-latency BS2 204*b*, leaving a service coverage of the low-latency BS1 204*a*. Then, the F1 bearer configured between the low-latency UE 202*a* and the low-latency BS1 204*a* is released. The low-latency UE 202*a* then performs a location registration procedure A with the low-latency BS2 204*b* to prevent stop of the low-latency services 1 through 3 provided from the low-latency BS servers connected with the low-latency BS1 204*a*. Likewise, as the low-latency UE 202*a* moves again as indicated by 202*c*, the low-latency UE 202*a* enters a service coverage of a low-latency BS3 204*c*, leaving the service coverage of the low-latency BS2 204*b*. Also in this case, the F1 bearer configured between the low-latency UE 202*a* and the low-latency BS2 204*b* is released, and the low-latency UE 202*a* performs the location registration procedure A with the low-latency BS3 204*c* to prevent stop of the low-latency services 1 through 3 provided from the low-latency BS servers connected with the low-latency BS2 204*b*. Thus, regardless of whether an MT support service is provided for the low-latency services 1 through 3, the low-latency UE 202*a* has to perform unnecessary location registration in a BS to which the low-latency UE 202*a* is attached each time when the low-latency UE 202*a* moves.

Moreover, a low-latency BS in which the low-latency UE 202*a* registers its location has to perform an F2 bearer reconfiguration procedure B with its respective BS servers, increasing a signaling load.

Meanwhile, if a new low-latency BS to which the low-latency UE moves and is attached does not provide all the low-latency services which have been provided to the low-latency UE, the low-latency UE may experience stop of some services. To be more specific, it is assumed that the low-latency UE 202*a* moves the service coverage of the low-latency BS3 204*c*, the F1 bearer with the low-latency BS2 204b is released. In this case, the low-latency BS3 204c does not support a low-latency service 1 C among the low-latency services 1 through 3 provided by the low-latency BS servers connected with the low-latency BS2 204b. Thus, even if completing registration of a location in the low-latency BS3 204c, the low-latency UE 204a may not receive an MT signal of the low-latency service 1 through servers connected with the low-latency BS3 204c.

Hence, an embodiment of the present disclosure proposes a method for a low-latency UE in an idle mode to receive an MT signal generated in an MT support service. The MT signal is a signal unidirectionally sent to a UE by a server that provides a service to the UE, and may include, for example, a push message, a voice over LTE (VoLTE) receiving signal, and so forth.

While a description of embodiments of the present disclosure will be focused on an evolved packet system (EPS), a main subject matter of the present disclosure may be applied with some modifications thereof to other communication systems having a similar technical background, without significantly departing from a range of the present disclosure, as will be obvious to those of ordinary skill in the art. In addition, it should be noted that a description of embodiments of the present disclosure will be made based on a low-latency system, a target to which the embodiments of the present disclosure is applied is not limited to a low-latency system.

In an embodiment of the present disclosure, an area in which a UE is provided with a low-latency service (hereinafter, referred to as a 'service area (SA)') will be defined. In an embodiment of the present disclosure, to separate SA registration and location registration, location registration for being provided with a low-latency service (hereinafter, referred to as 'service area update (SAU)') is performed separately from a general location registration procedure of a UE.

More specifically, in SAU according to an embodiment of the present disclosure, a UE registers its location in a serving BS selectively according to whether a low-latency service to be used is an MT support service. First, a low-latency UE according to an embodiment of the present disclosure identifies a 'service support state' of a low-latency BS to which the low-latency UE moves and is newly attached, and performs SAU based on the identified service support state. Herein, the service support state is identified based on a list of low-latency services that may be provided by the low-latency BS (hereinafter, referred to as a 'support service list'), in which the support service list is obtained through system information, for example, a system information block (SIB), broadcast by the newly attached low-latency BS. That is, it is determined whether at least one of low-latency services used immediately before the low-latency UE switches to the idle mode (hereinafter, referred to as 'on-going services') is included in the support service list. According to an embodiment, the support service list may include mapping of information about whether each of the low-latency services included in the support service list is an MT support service (hereinafter, referred to as 'MT support indication information'). Thus, if the newly attached low-latency BS supports at least one on-going services, whether there is an MT support service among the on-going services is included by using the MT support indication information included in the support service list. The newly attached low-latency BS may support, for a low-latency UE, one or more on-going low-latency services, one or more of which may be an MT support service.

According to an embodiment of the present disclosure, a low-latency BS having received an SAU request from a low-latency UE performs a service controller (SC) function for providing a low-latency service to the low-latency UE. The SC function according to an embodiment of the present disclosure may include all operations for providing a low-latency service to a low-latency UE. For example, the SC function may include managing a low-latency context of the low-latency UE, configuring or updating an F2 bearer with a low-latency BS server connected to the low-latency BS, providing an MT signal to the low-latency UE, and so forth. In other words, the low-latency UE according to an embodiment of the present disclosure is provided with a low-latency service from the low-latency BS in which the low-latency UE is registered for the SC function.

An embodiment of the present disclosure may be roughly described with the following embodiments;

First Embodiment: Method for determining whether a low-latency service is an MT support service at a low-latency UE according to an embodiment of the present disclosure;

Second Embodiment: Method for managing a low-latency context according to an embodiment of the present disclosure;

Third Embodiment: Method for managing a list of services available to the low-latency UE according to an embodiment of the present disclosure;

Fourth Embodiment: Method for requesting SAU at the low-latency UE and performing SAU at the low-latency BS having received the SAU request according to an embodiment of the present disclosure; and Fifth Embodiment: Method for providing an MT signal to the low-latency UE according to an embodiment of the present disclosure.

Depending on whether the low-latency service according to an embodiment of the present disclosure is an MT support service, whether to perform SAU is determined. If the low-latency service is an MT support service, to provide an MT signal generated in a server, a low-latency BS connected with the server needs to identify a location of the low-latency UE using an MT support service at all times.

On the other hand, if the low-latency service is an MT non-support service, the low-latency service is a mobile originated (MO) service for transmitting and receiving a bidirectional signal, such as when the UE forwards a request to the server and a user watches video images forwarded from the server through the UE. That is, the MT non-support service is a service that the low-latency UE initiates at all times, such that the low-latency BS does not have to identify a location of the UE when providing the MT non-support service.

First Embodiment (Determining Whether a Low-Latency Service is an MT Support Service)

According to the first embodiment of the present disclosure, a low-latency UE determines whether a low-latency service to be used by the low-latency UE is an MT support service. More specifically, the determining operation according to an embodiment of the present disclosure may be performed by the low-latency UE based on information received through a low-latency BS or server to which the low-latency UE is attached or an operator.

First, the low-latency BS according to an embodiment of the present disclosure configures and broadcasts a support service list including supportable low-latency services. The support service list may include a service name corresponding to each low-latency service and MT support indication information mapped thereto. The MT support indication information may be set to, for example, a 1-bit value of '1' indicating that a low-latency service is an MT support service or '0' indicating that a low-latency service is an MT non-support service. In this case, the low-latency UE receives the support service list broadcast from the low-latency BS to which the low-latency UE is attached and checks MT support indication information mapped to each low-latency service name from the received support service list to determine whether the low-latency service to be used by the low-latency UE is an MT support service. According to another embodiment, whether an MT signal is supported may be explicitly indicated in a service name of each low-latency service. For example, if a low-latency service having a service name of 'IP-less Btv' is an MT support service, a character explicitly indicating the MT support service, for example, 'MT' may be added to IP-less Btv, like 'IP-less Btv_MT'. In this case, the low-latency UE already knows that the low-latency service is the MT support service by being notified in advance of a character explicitly indicating the MT support service in the service name from an operator through over-the-air (OTA). 'MT' is an example, and the character may be set differently from operator to operator. In this case, the low-latency UE recognizes a low-latency service having a service name including the character MT in the obtained support service list as an MT support service.

The low-latency UE according to another embodiment may be attached to a low-latency BS server connected with a low-latency BS through the low-latency BS, and then may receive information indicating whether a low-latency service provided by the low-latency BS server is an MT support service through the low-latency BS server. According to an embodiment, the information may be expressed in the form of a service name having added thereto a particular character indicating an MT support service. The information may be received through, for example, a response received by a low-latency UE from a low-latency BS server in an initial connection process between the low-latency UE and the low-latency BS server. According to another embodiment, the information may be configured by mapping MT identification information to each service name of each low-latency service provided by the low-latency BS server.

According to another embodiment, the operator may forward in advance a list of low-latency services corresponding to MT support services to the low-latency UE through Open Mobile Alliance-Device Management (OMA-DM), etc. In this case, the low-latency UE stores the list received from the operator and recognizes the low-latency services corresponding to the MT support services. Thus, once receiving the support service list through the low-latency BS, the low-latency UE may identify the MT support services recognized from the low-latency services included in the support service list.

Second Embodiment (Managing a Low-Latency Context)

As described before, a low-latency system, which is an example of a communication system to which an embodiment of the present disclosure is applied, may include a low-latency UE, a low-latency BS, and a low-latency BS server as described with reference to FIG. 1. Herein, to provide a low-latency service to a low-latency UE attached to the low-latency BS, the low-latency BS manages a low-latency context of the low-latency UE. When the low-latency UE enters an idle mode, the low-latency BS releases resources of the low-latency UE, requiring a scheme for managing a low-latency context of the low-latency UE. Thus, the second embodiment of the present disclosure proposes three schemes for managing a low-latency context of a low-latency UE entering the idle mode.

Figure 3A:
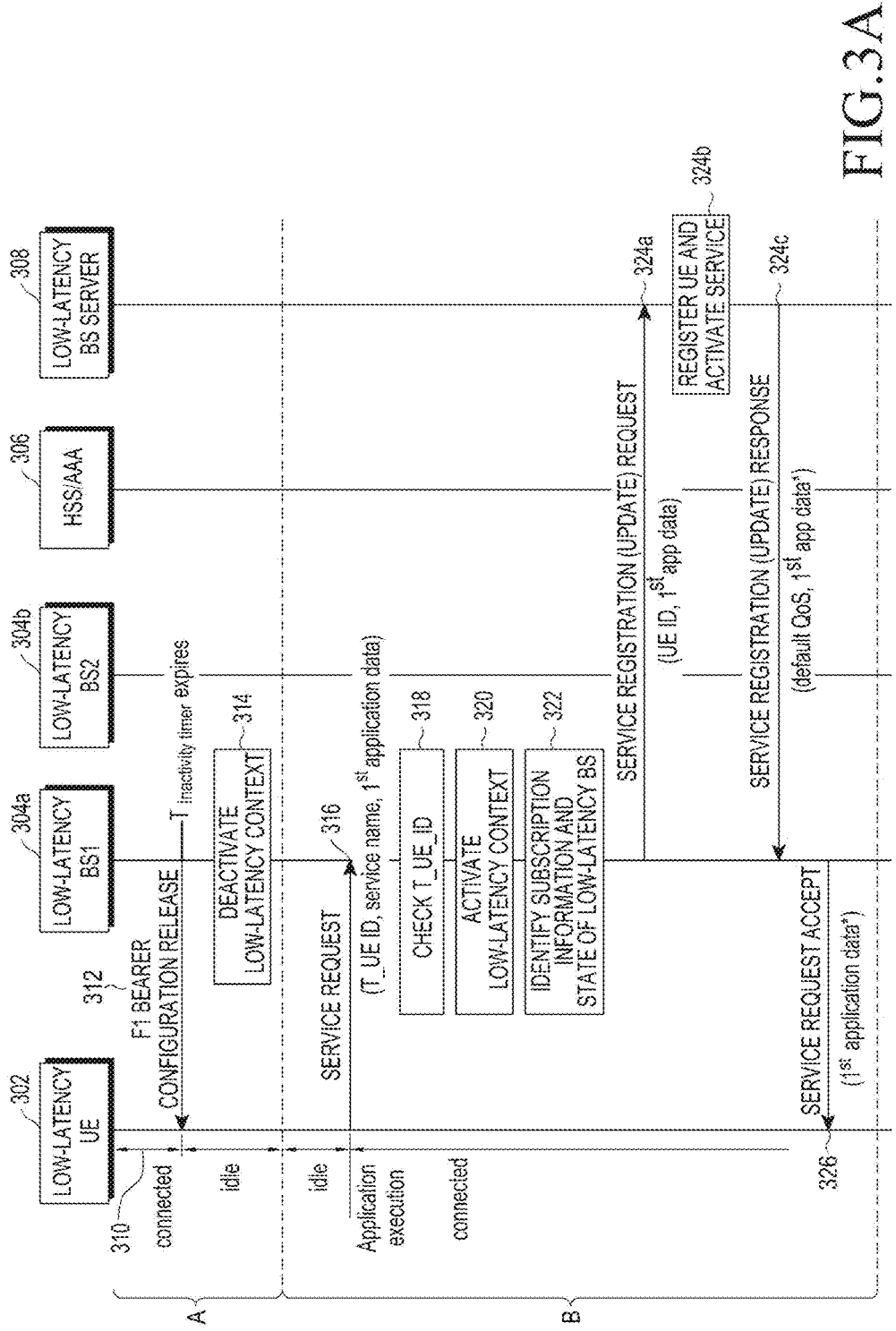
FIGS. 3A and 3B illustrate a method for managing a low-latency context of a low-latency UE entering an idle mode according to a first scheme of a second embodiment of the present disclosure.
Figure 3B:
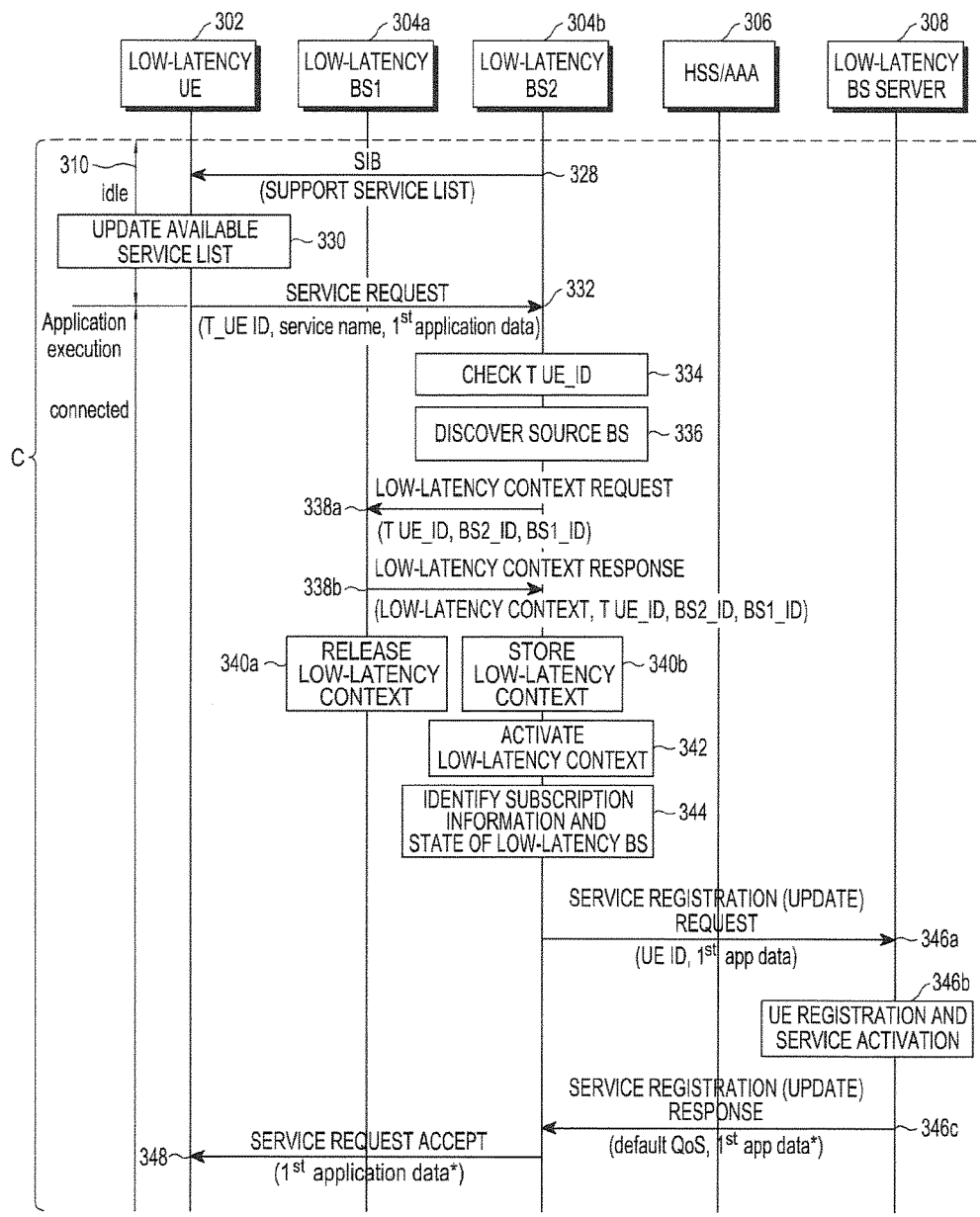

In an embodiment of a first scheme, if a low-latency BS senses a switch point to the idle mode for the low-latency UE, the low-latency BS stores a low-latency context of the low-latency UE and then switches the low-latency UE to the idle mode. Thereafter, once the low-latency UE switches to a connected mode through wireless connection, a new low-latency BS to which the low-latency UE is newly attached may request a low-latency context of the low-latency UE from the serving low-latency BS. FIGS. 3A and 3B illustrate a method for managing a low-latency context of a low-latency UE entering an idle mode according to the first scheme of a second embodiment of the present disclosure.

Referring to FIGS. 3A and 3B, the first scheme according to the second embodiment of the present disclosure will be described separately using a case (A) a low-latency UE 302 attached to a serving low-latency BS, i.e., a low-latency BS1 304a, switches to the idle mode, a case (B) the low-latency UE 302 switches back to a connected mode with the low-latency BS1 304a, and a case (C) the low-latency UE 302 moves to a coverage of a low-latency BS2 304b and thus switches to a connected mode with the low-latency BS2 304b.

A: Switch of the Low-Latency UE 302 to the Idle Mode

Once sensing absence of data transmission and reception to and from the low-latency UE 302 in the connected mode with the low-latency BS1 304a for a predetermined time in operation 310, the low-latency BS1 304a forwards an F1 bearer configuration release to the low-latency UE 302 and switches the low-latency UE 302 to the idle mode in operation 312. The predetermined time may be preset by an operator. In operation 314, the low-latency BS1 304a stores a low-latency context of the low-latency UE 302 and moves the low-latency context to an inactive memory to deactivate the low-latency context. Herein, the low-latency BS1 304a, when storing the low-latency context, may map T_UE_ID of the low-latency UE 302 to the low-latency context to identify the low-latency context.

B: Switch to the Connected Mode with the Low-Latency BS1 304a

Assuming that a user executes an application corresponding to a low-latency service provided through a low-latency BS server connected with the low-latency BS1 304a, the low-latency UE 302 forwards a service request to the low-latency BS1 304a in operation 316. The service request may include T_UE_ID of the low-latency UE 302, a service name 1 of a low-latency service corresponding to the application, and first ($1^{st}$) application data to be transmitted by the low-latency UE 302 to the low-latency BS server that provides the low-latency service. The $1^{st}$ application data may be, for example, expressed in the form of a GET request in a hypertext transfer protocol (HTTP), etc.

Then, in operation 318, the low-latency BS1 304a determines whether a low-latency context mapped to T_UE_ID is stored using T_UE_ID obtained through the service request. If the low-latency context mapped to T_UE_ID is stored, the low-latency BS1 304a activates the low-latency context of the low-latency UE 302. That is, the low-latency BS1 304a moves the low-latency context of the low-latency UE 302 in the inactive memory to an active memory. In operation 322, the low-latency BS1 304a identifies subscription information of the low-latency UE 302, a BS state in relation to an overload of the low-latency BS1 304a, etc., to determine whether the service requested in operation 316 may be provided. For example, it may be assumed that it is determined that a low-latency service 1 corresponding to a service name 1 obtained in operation 316 may be provided through a low-latency BS server 308 connected with the low-latency BS1 304a. Then, in operation 324a, the low-latency BS1 304a sends a service registration (or update) request to the low-latency BS server 308 connected thereto to forward the service request of the low-latency terminal 302. If the low-latency BS1 304a has not been attached to the low-latency BS server 308, the low-latency BS1 304a forwards the service registration request to the low-latency BS server 308. If the low-latency BS1 304a has been attached to the low-latency BS server 308 and the F2 bearer has been configured, the low-latency BS1 304a forwards the service update request to the low-latency BS server 308. Although the single low-latency BS1 304a and the single low-latency BS server 308 are illustrated for convenience, the low-latency BS1 304a may be physically connected to two or more low-latency BS servers. The low-latency BS server 308 may provide one or more low-latency services. Herein, the service registration (or update) request may include T_UE_ID and $1^{st}$ application data obtained from the service request of operation 316. In operation 324b, the low-latency BS server 308 registers the low-latency UE 302 for the low-latency service 1 and activates the low-latency service 1 in response to the service registration (or update) request. In operation 324c, the low-latency BS server 308 forwards a response with respect to the service registration (or update) request to the low-latency BS1 304A. Herein, the response with respect to the service registration (or update) request may include a default QoS defined as a quality of service (QoS) set for the F2 bearer between the low-latency BS1 304a and the low-latency BS server 308 and $1^{st}$ application data* that is a response with respect to the $1^{st}$ application data of operation 316. Then, in operation 326, the low-latency BS1 304a forwards a service request accept including the $1^{st}$ application data* to the low-latency UE 302 in response to the service request received in operation 316.

C: Switch to the Connected Mode with the Low-Latency BS2 304b

It is assumed that the low-latency UE 302 in the idle mode moves to a coverage of a low-latency BS2 304b out of a coverage of the low-latency BS1 304a in A. In this case, in operation 328, the low-latency UE 302 receives system information, e.g., the SIB, broadcast by the low-latency BS2 304b. In operation 330, the low-latency UE 302 updates a list of available services based on a support service list of the low-latency BS2 304b obtained from the SIB. According to an embodiment, the low-latency UE 302 obtains a service name including a character indicating an MT support service or MT support indication information mapped to the service name, included in the support service list, to update whether low-latency services included in the service list are MT support services. In operation 332, the low-latency UE 302 forwards a service request to the low-latency BS2 304b. The service request is assumed to include the same service name 1 as the service request of operation 316. In operation 334, the low-latency BS2 304b checks T_UE_ID received through the service request. The low-latency BS2 304b is assumed to determine that a low-latency context mapped to T_UE_ID is not stored. Then, the low-latency BS2 304b identifies an address or a location of a previous serving low-latency BS of the low-latency UE 302, that is, the low-latency BS1 304a in operation 336. The address or location of the low-latency BS1 304a may be explicitly included in the service request sent by the low-latency UE 302 in operation 332 or may be extracted from a separate parameter included in the service request, according to an embodiment. In operation 338a, the low-latency BS2 304b forwards a context request to the low-latency BS1 304a corresponding to the identified address or location. Herein, the context request may include T_UE_ID of the low-latency UE 302, ID of the low-latency BS2 304b, and ID of the low-latency BS1 304a. In operation 338b, the low-latency BS1 304a forwards a low-latency context of the low-latency UE 302 in response to the context request. The response may include T_UE_ID, ID of the low-latency BS2 304b, and ID of the low-latency BS1 304a. The low-latency BS1 304a removes a stored low-latency context of the low-latency UE 302 in operation 340a, and the low-latency BS2 304b stores the low-latency context of the low-latency UE 302 in operation 340b. The low-latency BS2 304b activates the low-latency context of the low-latency UE 302 in operation 342, and provides the low-latency service 1 of the low-latency BS server 308 to the low-latency UE 302 in operations 344 through 348. Operations 344 through 348 are the same as operations 322 through 326, and thus will not be described repetitively.

Figure 4A:
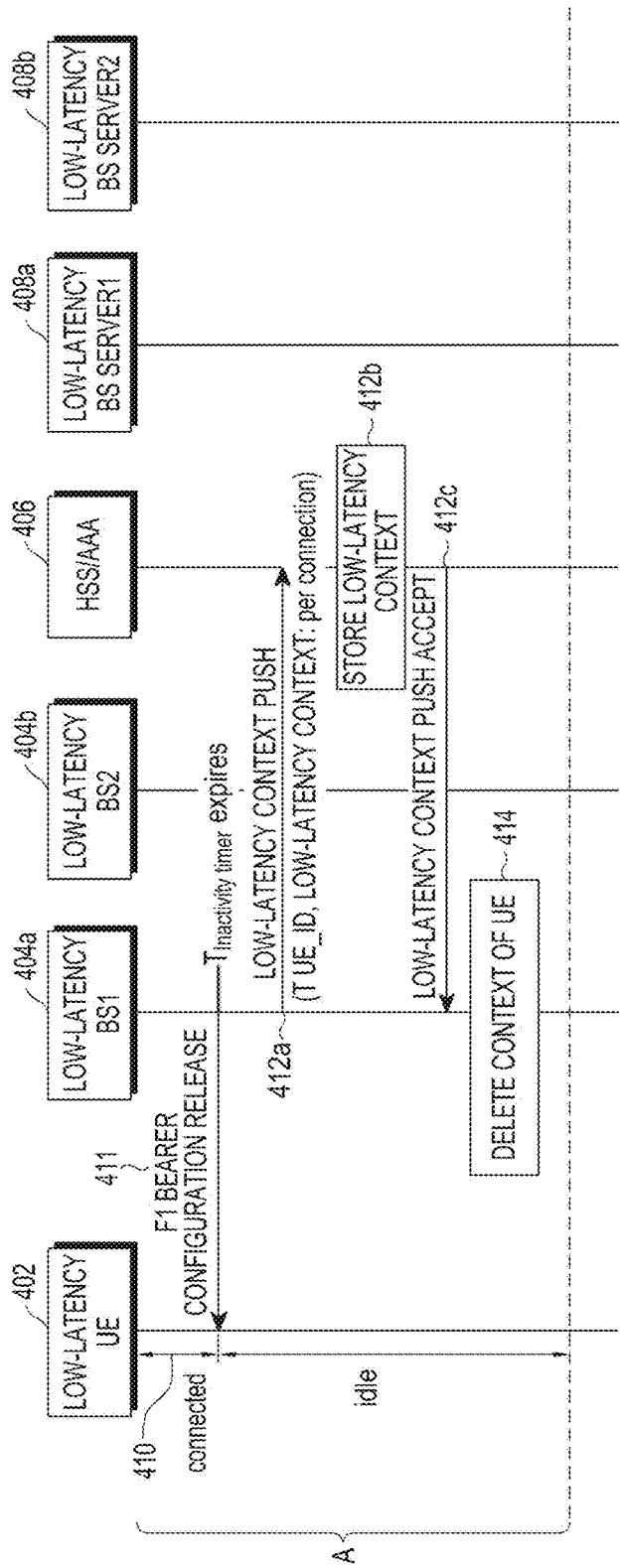
FIGS. 4A through 4C illustrate a method for managing a low-latency context of a low-latency UE through AAA/HSS according to a second scheme of a second embodiment of the present disclosure.
Figure 4B:
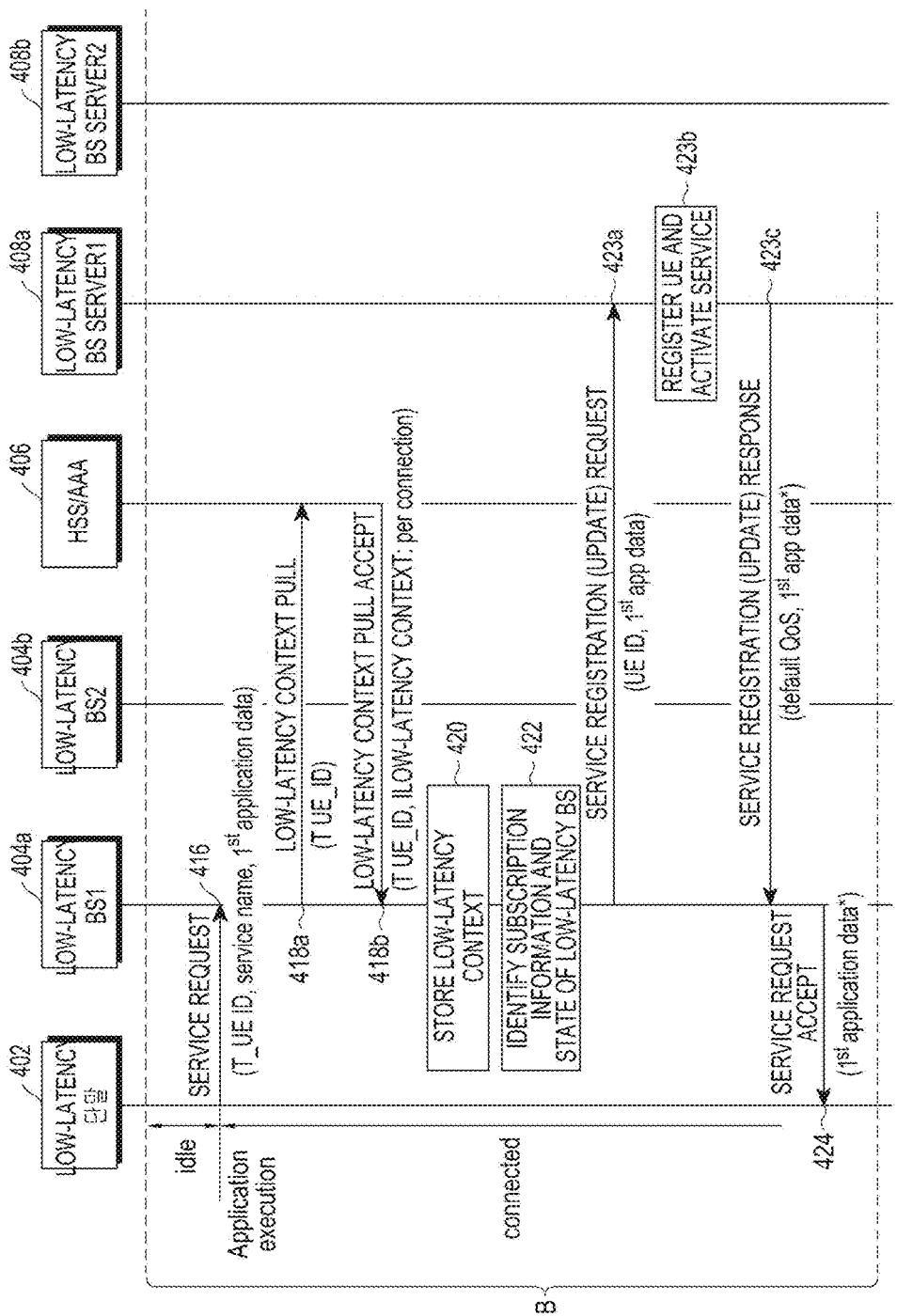
Figure 4C:
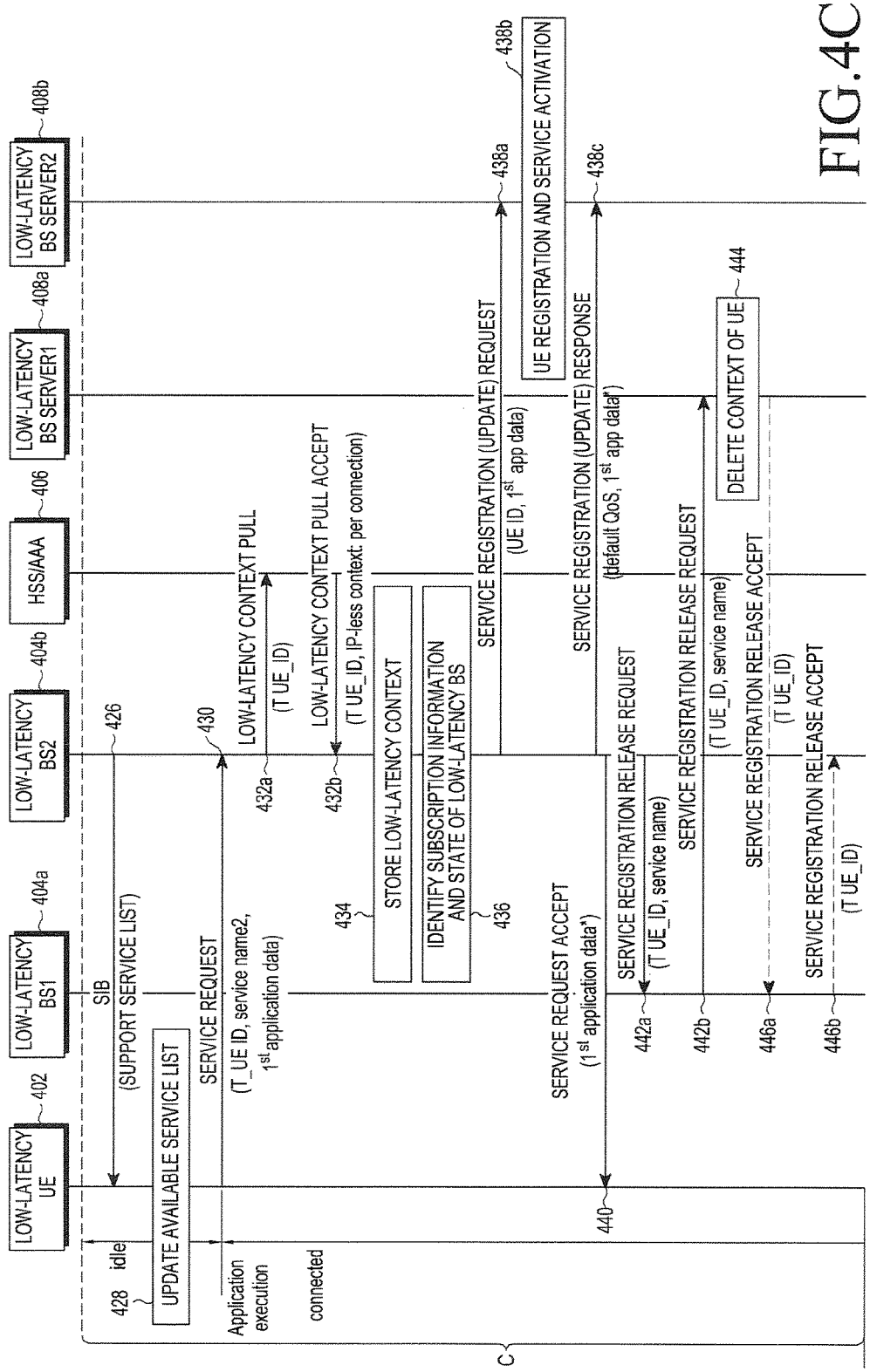

Next, in an embodiment of the second scheme, once sensing a switch point to the idle mode for a low-latency UE, a low-latency BS according to an embodiment of the present disclosure stores a low-latency context of the low-latency UE in an authentication, authorization, accounting (AAA) or a home subscriber server (HSS) and then switches the low-latency UE to the idle mode. Once the low-latency UE in the idle mode switches to the connected mode with a new low-latency BS through wireless connection, the new low-latency BS requests and obtains a low-latency context of the low-latency UE stored in the AAA/HSS. Generally, the AAA/HSS manages authentication and subscription information, etc., for a low-latency UE through a connected low-latency BS. Herein, the subscription information may include a low-latency service list of low-latency services to which the low-latency UE subscribes, a QoS for each low-latency service included in the list, a service name, a category name of a category to which a plurality of low-latency services may belong, and so forth. FIGS. 4A through 4C illustrate a method for managing a low-latency context of a low-latency UE through the AAA/HSS according to the second scheme of the second embodiment of the present disclosure.

Referring to FIGS. 4A through 4C, the second scheme may also be described separately using the case (A) the low-latency UE 402 attached to a serving low-latency BS, i.e., the low-latency BS1 404a, switches to the idle mode, the case (B) the low-latency UE 402 switches back to the connected mode with the low-latency BS1 404a, and the case (C) the low-latency UE 302 moves to the coverage of a low-latency BS2 404b and thus switches to the connected mode with the low-latency BS2 404b.

A: Switch of the Low-Latency UE 402 to the Idle Mode

Once sensing absence of data transmission and reception to and from the low-latency UE 402 in the connected mode with the low-latency BS1 404a for a predetermined time in operation 410, the low-latency BS1 304a forwards an F1 bearer configuration release to the low-latency UE 402 and switches the low-latency UE 402 to the idle mode in operation 411. The predetermined time may be preset by an operator. In operation 412a, the low-latency BS1 404a sends a low-latency context push including a low-latency context of the low-latency UE 402 to an HSS/AAA 406. Herein, the low-latency context push may include T_UE_ID of the low-latency UE 402, and the low-latency context may be included per connection. The HSS/AAA 406 stores the low-latency context of the low-latency UE 402 obtained from the low-latency context push in operation 412b, and notifies the low-latency UE 402 of storing of the low-latency context by sending a low-latency context push accept to the low-latency UE 402 in operation 412c. In operation 414, the low-latency BS1 404a deletes the stored low-latency context of the low-latency UE 402.

B: Switch to the Connected Mode with the Low-Latency BS1 404a

It is assumed that the user executes an application corresponding to the low-latency service 1 through the low-latency UE 402. In operation 416, the low-latency UE 402 forwards a service request with respect to the low-latency service 1 to the low-latency BS1 404a. Herein, the service request is the same as described in operation 316 of FIG. 3A, and thus will not be described again. Assuming that the low-latency BS1 404a, which receives the service request, has deleted the low-latency context of the low-latency UE 402, the low-latency BS1 404a forwards a low-latency context pull requesting the low-latency context of the low-latency UE 402 to the HSS/AAA 406 in operation 418a. The low-latency context pull may include T_UE_ID of the low-latency UE 402. Then, in operation 418b, the HSS/AAA 406 identifies a low-latency context mapped to T_UE_ID of the low-latency UE 402 obtained from the low-latency context pull among low-latency contexts stored per T_UE_ID, and forwards a low-latency pull accept including the identified low-latency context and T_UE_ID of the low-latency UE 402 to the low-latency BS1 404a. In operation 420, the low-latency BS1 404a deletes stores the low-latency context obtained from the low-latency context pull accept. The low-latency BS1 404a performs operations 422 through 424 to provide the low-latency service 1 requested in operation 416 to the low-latency UE 402. Operations 422 through 424 are the same as operations 322 through 326, and thus will not be described repetitively.

C: Switch to the Connected Mode with the Low-Latency BS2 404b

It is assumed that the low-latency UE 402 in the idle mode moves to the coverage of the low-latency BS2 404b out of the coverage of the low-latency BS1 404a in A. In this case, in operation 426, the low-latency UE 402 receives an SIB including a support service list of the low-latency BS2 404b, broadcast from the low-latency BS2 404b. Once recognizing execution of an application mapped to a low-latency service 2 from the user, the low-latency UE 402 performs operations 428 and 430 in the same manner as operations 330 and 332 of FIG. 3B. However, it is assumed that a service name including a service request in operation 430, that is, a service name2 is different from service name1. The service name2 is assumed to indicate the low-latency service 2 supported through the low-latency BS server2 408b connected with the low-latency BS2 404b. The low-latency BS2 404b having received the service request forwards a low-latency context pull to the HSS/AAA 406 to request the low-latency context of the low-latency UE 402 in operation 432a. The low-latency context pull may include T_UE_ID of the low-latency UE 402. Then, in operation 432b, like in operation 418b, the HSS/AAA 406 forwards a low-latency pull accept including a stored low-latency context mapped to T_UE_ID of the low-latency UE 402 and T_UE_ID of the low-latency UE 402 to the low-latency BS2 404b. The low-latency BS2 404b then performs operations 434 and 436 similarly with operations 420 and 422. The low-latency BS2 404b performs service registration (or update) with the low-latency BS server2 408b that provides the low-latency service2 corresponding to the service name2 obtained from the service request of operation 430 in operations 438a through 438c, and delivers a service request accept with respect to the service request of operation 430 to the low-latency UE 402 in operation_440. Operations 438a through 440 are the same as operations 324a through 326 of FIG. 3A, and thus will not be described repetitively.

In operations 442a and 442b, the low-latency BS2 404b forwards a service registration release request for the low-latency service1, which has been provided, to the low-latency BS server1 408a through the low-latency BS1 404a. The service registration release request includes T_UE_ID of the low-latency UE 402 and the service name1 of the low-latency service1 provided by the low-latency BS server1 408a. In operation 444, the low-latency BS server1 408a deletes the low-latency context of the low-latency UE 402 to release registration of the low-latency UE 402. In operations 446a and 446b, the low-latency BS server1 408a forwards a service registration release accept to the low-latency BS2 404b through the low-latency BS1 404a to notify the low-latency BS2 404b of registration release of the BS server1 408a with respect to the low-latency UE 402. According to an embodiment, operations 446a and 446b may be omitted.

In an embodiment of the third scheme according to the second embodiment, considering interworking with an LTE system, an MME in place of an HSS/AAA may manage a low-latency context of a low-latency UE. In the embodiment, when the low-latency UE switches to the connected mode, a serving low-latency BS to which the low-latency UE is attached may request and obtain the low-latency context of the low-latency UE from the MME. Likewise, if the low-latency UE moves to a new low-latency BS, the new low-latency BS may request and obtain the low-latency context of the low-latency UE from the MME.

Third Embodiment (Managing a Service List of a Low-Latency UE)

Low-latency services supportable by respective low-latency BSs according to an embodiment of the present disclosure may differ from BS to BS. Thus, in the third embodiment of the present disclosure, a low-latency UE manages or updates a service list of available services based on a support service list per low-latency BS to which the low-latency UE is attached as moving. The low-latency UE may also manage an on-going list including low-latency services being used (or on-going low-latency services) before entering an idle mode according to an embodiment.

Figure 5:
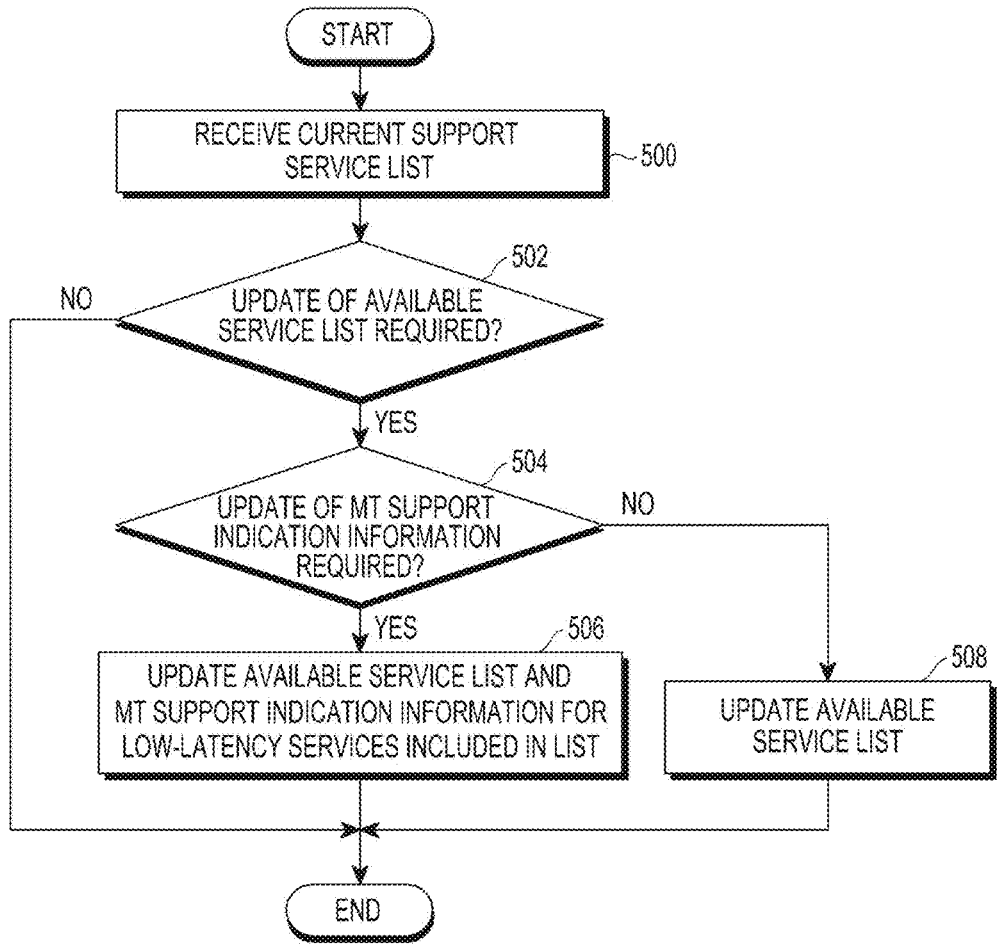
FIG. 5 is a flowchart illustrating an operation of managing a list of services available to a low-latency UE according to a third embodiment of the present disclosure.

FIG. 5 is a flowchart illustrating an operation of managing a list of services available to a low-latency UE according to the third embodiment of the present disclosure.

Referring to FIG. 5, in operation 500, the low-latency UE receives a current support service list from a serving low-latency BS having a coverage in which the low-latency UE is currently located. The low-latency UE in the idle mode may receive the current support service list through a broadcasting channel, and the low-latency UE in the connected mode may receive the current support service list through any type of message sent from the serving low-latency BS. In operation 502, the low-latency UE determines whether to update its available service list based on the current support service list. If the current support service list does not match a previous support service list obtained from a previous serving low-latency BS due to movement of the low-latency UE, the low-latency UE determines to update the available service list and goes to operation 504. If the previous support service list matches the current support service list, the low-latency UE terminates its operation.

In operation 504, the low-latency UE determines whether to update MT support indication information for low-latency services included in the updated available service list. If updating of the MT support indication information is required, the low-latency UE updates the available service list and the MT support indication information for the low-latency services included in the list in operation 506.

If updating of the MT support indication information is not required, the low-latency UE updates only the available service list in operation 508. According to an embodiment, the available service list and the MT support indication information for the low-latency services included in the list may be implemented as separate lists. According to another embodiment, the MT support indication information may be implemented as shown in <Table 1> with an available service list and mapping of a separate indicator for MT support indication information to each of low-latency services included in the list. For example, the indicator, which is an one-bit value, may be set to '1' for support and '0' for non-support.

TABLE 1

| Available Service Name | MT Support |
| --- | --- |
| Low-Latency Service 1 | Support |
| Low-Latency Service 2 | Non-Support |
| Low-Latency Service 3 | Non-Support |

Referring to <Table 1>, the service list and the MT support indication information may be indicated and managed, such that available low-latency services of a low-latency UE are a total of three low-latency services 1 through 3, among which the low-latency service 1 is MT-supported, and low-latency services 2 and 3 are not MT-supported.

The on-going service list implemented in the low-latency UE according to an embodiment of the present disclosure may be implemented as in <Table 2> by indicating a service name of each low-latency service being used before the low-latency UE switches to the idle mode and MT support indication information mapped to the service name. Likewise, the MT support indication information may indicate MT support of a low-latency service with an one-bit value.

TABLE 2

| On-Going Service Name | MT Support |
| --- | --- |
| Low-Latency Service 1 | Support |
| Low-Latency Service 2 | Non-Support |

Fourth Embodiment (SAU Method Based on Low-Latency UE or Low-Latency BS)

According to the fourth embodiment of the present disclosure, a low-latency UE entering the idle mode updates an available service list and MT support indication information for low-latency services included in the list. If a low-latency service to be used is an MT support service based on the update result, the low-latency UE determines to perform SAU.

Figure 6A:
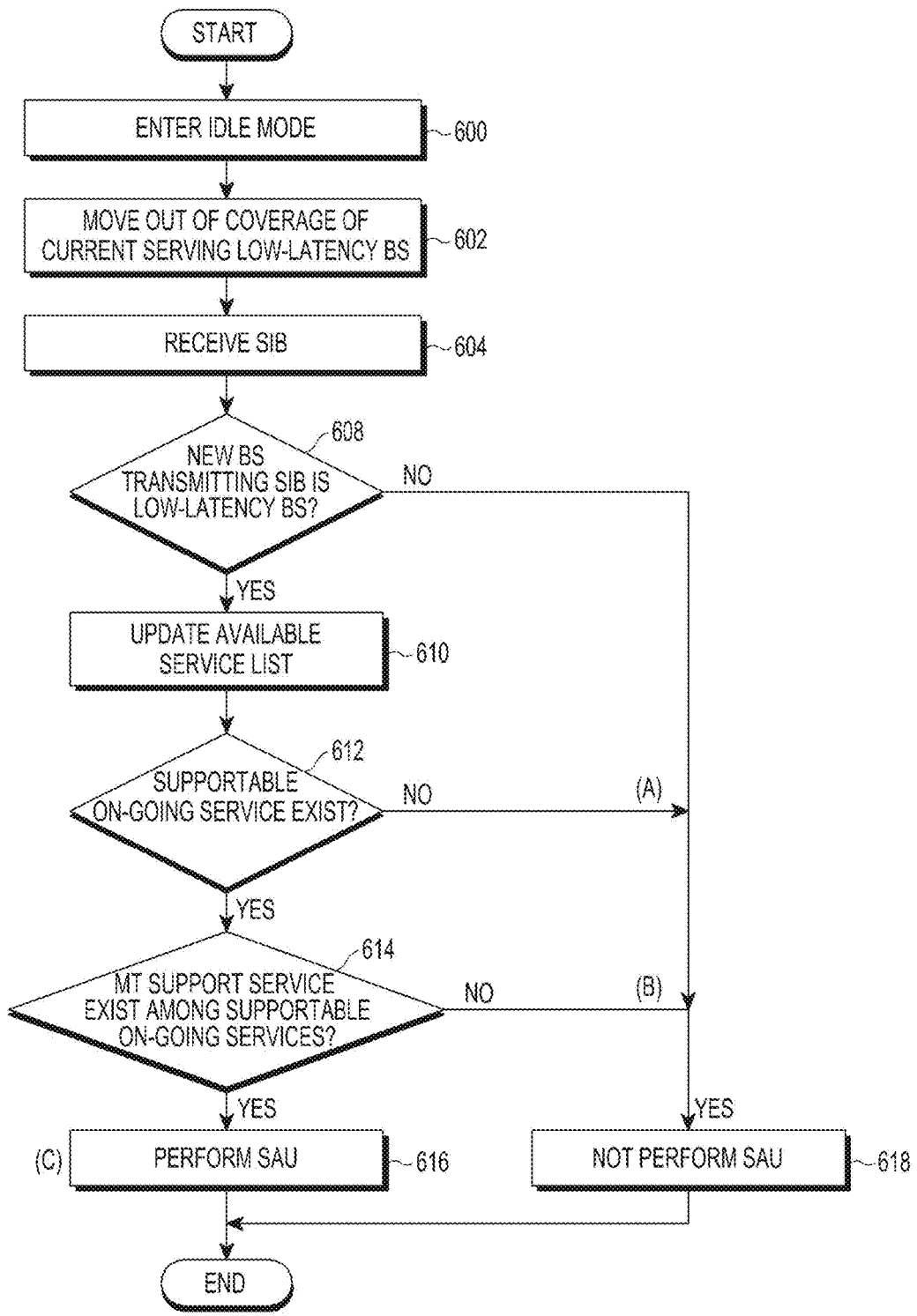
FIG. 6A is a flowchart illustrating an SAU operation of a low-latency UE according to an embodiment of the present disclosure.

FIG. 6A is a flowchart illustrating an SAU operation of a low-latency UE according to an embodiment of the present disclosure.

Referring to FIG. 6A, it is assumed that a low-latency UE entering the idle mode with respect to a current serving low-latency BS in operation 600 moves outside a coverage of the current serving low-latency BS in operation 602. In operation 604, the low-latency UE receives system information, e.g., an SIB, broadcast from a new BS having a coverage in which the low-latency UE is currently located. In operation 608, the low-latency UE determines whether the new BS is a low-latency BS according to whether a support service list included in the SIB includes low-latency services. If the new BS is not a low-latency BS, the low-latency UE performs a general location registration procedure without performing SAU according to an embodiment of the present disclosure in operation 618.

If the support service list included in the SIB includes low-latency services, the low-latency UE determines that the new BS is a low-latency BS and goes to operation 610. According to another embodiment, the low-latency UE determines that the new BS is a low-latency BS by using a broadcasting message received from the new BS. According to an embodiment, the BS may broadcast the SIB including a parameter that explicitly/directly indicates whether the BS is a low-latency BS. According to another embodiment, the BS may broadcast the SIB including a list of low-latency BSs. According to another embodiment, the low-latency UE may receive information indicating whether a low-latency service is supported from the new BS during a connection procedure with the new BS. Herein, for convenience, a description will be made assuming that a low-latency UE determines through a low-latency service list obtained through an SIB, whether a new BS in which the low-latency UE is currently located is a low-latency BS. However, the determination may be performed according to one of the above-described embodiments.

In operation 610, the low-latency UE updates an available service list based on a support service list of the new BS. A detailed process of the update operation corresponds to the update procedure of FIG. 5 and thus will not be described repetitively.

In operation 612, the low-latency UE determines based on the support service list of the new BS whether the new BS supports low-latency services included in an on-going service list of the low-latency UE. If the new BS supports at least one on-going service included in the on-going service list, the low-latency UE goes to operation 614. In operation 614, the low-latency UE determines whether there is an MT support service among at least one on-going services supported by the new BS. If there is an MT support service, the low-latency BS enters a situation C to perform SAU according to an embodiment of the present disclosure in operation 616. Once determining to perform SAU according to an embodiment, the low-latency BS sends an SAU request to the new BS.

If the new BS does not support an on-going service in operation 612 of FIG. 6A, the low-latency UE enters a situation A and does not perform SAU according to an embodiment of the present disclosure. If there is no MT support service among the on-going services supported by the new BS in operation 614 of FIG. 6A, the low-latency UE enters a situation B and does not perform SAU according to an embodiment of the present disclosure.

Figure 6B:
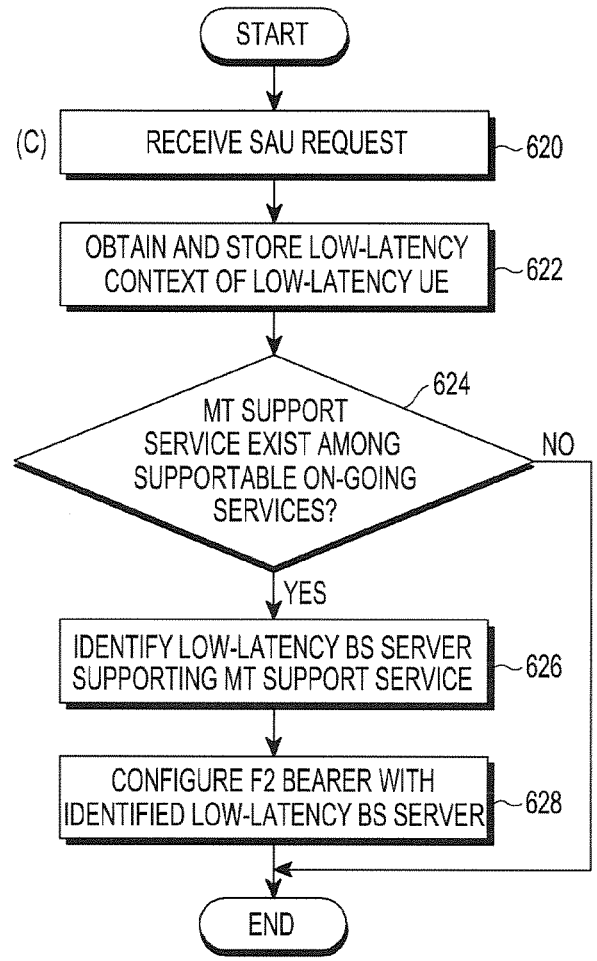
FIG. 6B is a flowchart illustrating an SAU operation of a low-latency base station (BS) according to a fourth embodiment of the present disclosure.

FIG. 6B is a flowchart illustrating an SAU operation of a low-latency BS according to a fourth embodiment of the present disclosure. Herein, for convenience, the low-latency BS is assumed to receive an SAU request from the low-latency UE of FIG. 6A.

Referring to FIG. 6B, in operation 620, the low-latency BS is assumed to receive the SAU request from the low-latency UE entering the situation C. The low-latency BS then obtains and stores a low-latency context of the low-latency UE in operation 622. Once receiving the SAU request from the low-latency UE, the low-latency BS according to an embodiment of the present disclosure performs the SC function with respect to the low-latency UE. Herein, a low-latency context may be obtained from a previous serving low-latency BS of the low-latency UE according to the second embodiment of the present disclosure or may be obtained from the AAA/HSS or the MME. The obtaining of the low-latency context has already been described with reference to FIGS. 3A through 4C, and thus will not be described in detail. If the low-latency BS obtains and stores the low-latency context of the low-latency UE according to the second embodiment of the present disclosure, the low-latency BS activates the low-latency context and goes to operation 624. In operation 624, the low-latency BS determines, based on the low-latency context of the UE, whether there is an MT support service among on-going services supportable by the new BS. If there is an MT support service, the low-latency BS identifies a low-latency BS server that supports the MT support service among low-latency BS servers connected to the low-latency BS in operation 626. In operation 628, the low-latency BS configures or updates an F2 bearer according to a connection state with the identified low-latency BS server. If there is no MT support service, the low-latency BS terminates its operation.

Figure 7A:
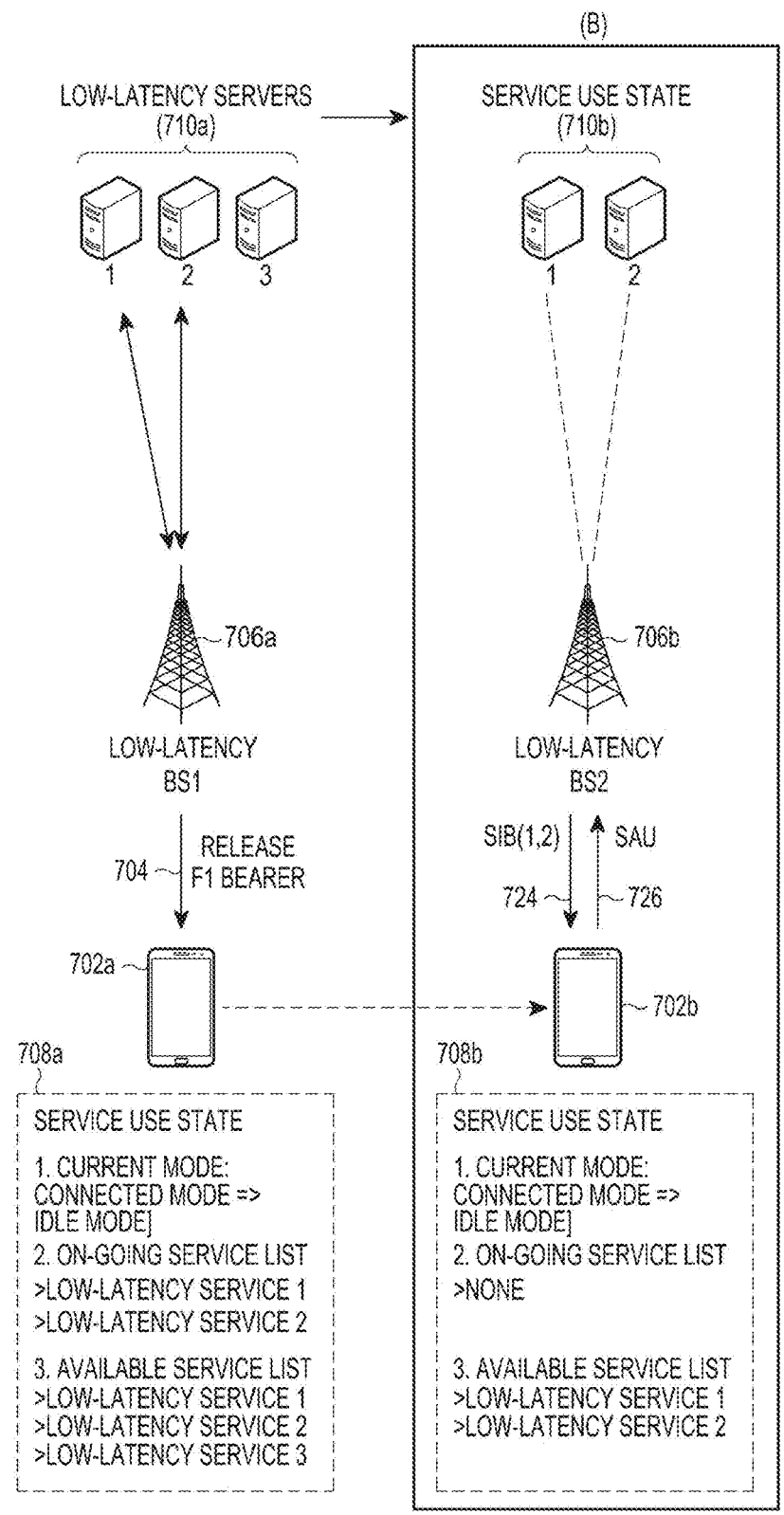
FIG. 7A illustrates an example of a situation where there is no MT support service among on-going services supported through a new low-latency BS to which a low-latency UE moves and is attached according to a fourth embodiment of the present disclosure.

FIG. 7A illustrates an example of a situation where there is no MT support service among on-going services supported through a new low-latency BS to which a low-latency UE moves and is attached according to a fourth embodiment of the present disclosure.

Referring to FIG. 7A, a low-latency UE 702a has an F1 bearer configured for a low-latency BS1 706a, which is a current serving BS, and enters the idle mode from the connected mode because of performing no data transmission and reception for a predetermined time. Then, due to the entrance of the low-latency UE 702a to the idle mode, the F1 bearer is released in operation 704. The low-latency BS1 706a is connected with low-latency BS servers 710a that provide low-latency services 1 through 3. The low-latency BS servers 710a may be divided into physical servers corresponding to the low-latency services 1 through 3 or may provide the low-latency services 1 through 3 in the form of a single server. Thus, the low-latency BS1 702a configures a support service list including the low-latency services 1 through 3 and broadcasts system information, e.g., an SIB, including the support service list.

The low-latency UE 702a manages its service use state 708a. According to an embodiment, the service use state 708a may include a current mode, and an available service list and an on-going service that are configured based on a support service list received from a current serving BS. Herein, the available service list and the on-going service list may be managed by mapping MT support to each low-latency service included in each list. It is assumed that all of the low-latency services 1 through 3 provided by the low-latency BS servers 710a are MT-non-support services.

Then, it is also assumed that the low-latency UE 702a in the idle mode moves to a new low-latency BS2 706b. The low-latency BS2 706b is assumed to be connected with low-latency BS servers 710b that provide low-latency services 1 and 2. The low-latency UE 702a then receives a support service list of the low-latency BS2 706b from system information, e.g., an SIB, broadcast from the low-latency BS2 706b.

Thus, the low-latency UE 702a also manages its service use state 708b. The low-latency UE 702a is assumed to enter the idle mode because of not performing data transmission and reception to and from the low-latency BS2 706b for a predetermined time. The service use state 708b of the low-latency UE 702a then includes a current state set to the idle mode and an available service list including the low-latency services 1 and 2. Although the low-latency UE 702a may still use the low-latency services 1 and 2 included in the on-going service list before movement through the low-latency BS2 706b, these services are the MT-non-support services, and thus the low-latency UE 702a determines no need to perform SAU and thus determines not to perform SAU.

Figure 7B:
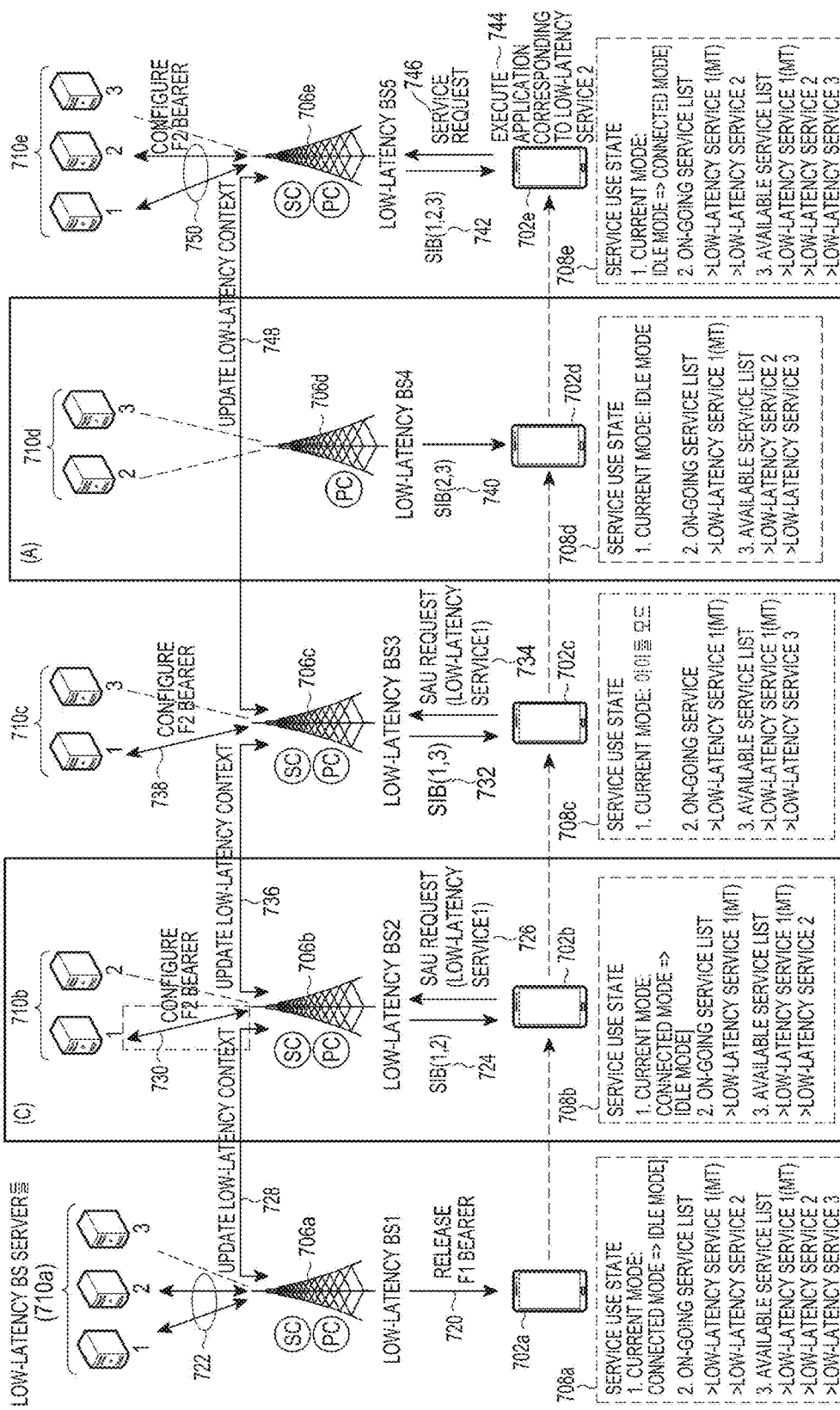
FIG. 7B illustrates an example of a situation where a low-latency UE performs SAU according to a fourth embodiment of the present disclosure.

FIG. 7B illustrates an example of a situation where a low-latency UE performs SAU according to the fourth embodiment of the present disclosure.

Referring to FIG. 7B, the low-latency UE 702a, when being provided with the low-latency services 1 and 2 through the low-latency BS servers 710a connected to the low-latency BS1 706a to which the low-latency UE 702a is currently attached, is assumed to enter the idle mode. It is assumed that the low-latency BS1 706a provides a total of three low-latency services 1 to 3 through the low-latency BS servers 710a and the F1 bearer is released in operation 720 due to the entrance of the low-latency UE 702a to the idle mode. Herein, it is assumed that only the low-latency service 1 is an MT support service. In this case, the service use state 708a managed by the low-latency UE 702a includes a current mode set to the idle mode, an on-going service list including the low-latency services 1 and 2, and an available service list including the low-latency services 1 through 3. To provide the low-latency services 1 and 2 to the low-latency UE 702a, the low-latency BS1 706a has the F2 bearer configured with a low-latency BS server that provides the low-latency services 1 and 2 in operation 720. Thus, the low-latency BS1 706a performs a paging control (PC) function with respect to a serving BS for the low-latency UE 702a and performs the SC function that provides the low-latency services 1 and 2. In case of LTE, if a UE leaves a predetermined tracking area (TA), the UE registers its location in the MME to notify the MME of its location in the TA at all times. In an embodiment of the present disclosure, for convenience, each low-latency BS is assumed to perform the PC function corresponding to the operation of the MME, that is, an operation of recognizing a location of an UE attached to the low-latency BS. The low-latency UE according to an embodiment of the present disclosure is assumed to perform location registration only once for each low-latency BS to which the low-latency UE is attached by moving.

As an example of the situation C described with reference to FIGS. 6A and 6B, it is assumed that the low-latency UE 702a moves to a coverage of the low-latency BS2 706b. The low-latency BS2 706b is connected with low-latency BS servers 710b that provide the low-latency services 1 and 2. In operation 724, a low-latency UE 702b receives a support service list of the low-latency BS2 706b, which includes the low-latency services 1 and 2, through system information, e.g., an SIB, broadcast from the low-latency BS2 706b. As the low-latency service 1, which is an on-going service supportable by the low-latency BS2 706b, is an MT support service, the low-latency UE 702b determines to perform SAU with the low-latency BS2 706b, and sends an SAU request for the low-latency service 1 to the low-latency BS2 706*b* in operation 726. Then, in operation 728, the low-latency BS2 706*b* performs a low-latency context update procedure for requesting and obtaining a low-latency context of the low-latency UE 702*b* from the previous serving low-latency BS1 706*a* of the low-latency UE 702*b* according to an embodiment. According to another embodiment, the low-latency BS2 706*b* may perform the low-latency context update procedure through the HSS/AAA or the MME. The low-latency BS2 706*b* recognizes based on the low-latency context that the low-latency service 1 to be provided to the low-latency UE 702*b* is an MT support service, and configures the F2 bearer with a low-latency BS server that provides the low-latency service 1 in operation 730. Thus, the low-latency BS2 706*b* performs both the PC function and the SC function for the low-latency service 1 with respect to the low-latency UE 702*b*. In this case, the service use state 708*b* of the moving low-latency UE2 702*b* includes a current mode set to the idle mode, an on-going service list including the low-latency service 1, and an available service list including the low-latency services 1 and 2.

The low-latency UE 702*b* is assumed to move again and to be attached to a new low-latency BS3 706*c*. Herein, the low-latency BS3 706*c* may provide the low-latency services 1 and 3 through low-latency BS servers 710*c*. In operation 732, a low-latency UE 702*c* obtains a support service list of the low-latency BS3 706*c*, which includes the low-latency services 1 and 3, as receiving system information, e.g., an SIB, broadcast from the low-latency BS3 706*c*. As recognizing that the low-latency service 1, which is an on-going service supported through the low-latency BS3 706*c*, is an MT support service, the low-latency UE 702*c* forwards an SAU request to the low-latency BS3 706*c* in operation 734. The low-latency BS3 706*c* having received the SAU request may perform a low-latency context update procedure for requesting and obtaining a low-latency context of the low-latency UE 702*c* from the low-latency BS2 706*b* in operation 736. According to another embodiment, the low-latency context update procedure may also be performed by the HSS/AAA or the MME. The low-latency BS3 706*c* recognizes based on the low-latency context that the low-latency service 1 to be provided to the low-latency UE 702*c* is an MT support service, and configures the F2 bearer with the low-latency BS server 710*c* that provides the low-latency service 1 in operation 738. Thus, the low-latency BS2 706*b* performs both the PC function and the SC function for providing the low-latency service 1 with respect to the low-latency UE 702*b*. In this case, a service use state 708*c* of the low-latency UE 702*c* includes a current mode set to the idle mode, an on-going service list including the low-latency service 1, and an available service list including the low-latency services 1 and 3.

As an example of the above-described situation A, as moving again to a coverage of a low-latency BS4 706*d*, the low-latency UE 702*c* is assumed to receive system information, i.e., an SIB, broadcast from the low-latency BS4 706*d* in operation 740. Herein, the low-latency BS4 706*d* may provide the low-latency services 2 and 3 through low-latency BS servers 710*d*. The low-latency UE 706*d* then recognizes through the SIB that a support service list of the low-latency BS4 706*d* includes the low-latency services 2 and 3. In this case, as recognizing that the low-latency BS4 706*d* is not capable of providing the low-latency service 1 included in an on-going service list, a low-latency UE 702*d* determines not to perform SAU. Thus, the low-latency BS4 706*d* performs the PC function with respect to the low-latency UE 702*d*, but may not perform the SC function because there is no low-latency service that may be provided. As a result, the low-latency BS4 706*d* does not perform the operation of obtaining a low-latency context of the low-latency UE 702*d*. The low-latency BS4 706*d* discovers the low-latency BS3 706*c*, which is a previous serving BS of the low-latency UE 702*d*, and requests service registration through an X2 interface. As recognizing a location of the low-latency UE 702*d*, the low-latency BS3 706*c* continuously provides the low-latency service 1 to the low-latency UE 702*d*. In this case, a service use state 708*d* of the low-latency UE 702*d* includes a current mode set to the idle mode, an on-going service list including the low-latency service 1, and an available service list including the low-latency services 2 and 3.

In this case, the low-latency UE 702*d* is assumed to move again to a coverage of a low-latency BS5 706*e*. The low-latency BS5 706*e* may provide the low-latency services 1 and 3 through low-latency BS servers 710*e*. In operation 742, a low-latency UE 702*e* receives a support service list including the low-latency services 1 and 3 through system information, e.g., an SIB, broadcast from the low-latency BS5 706*e*. In operation 744, the low-latency UE 702*e* is assumed to receive input of an execution instruction of an application corresponding to the low-latency service 2 from a user terminal in the idle mode. In operation 746, the low-latency UE 702*e* switches to the connected mode and forwards a service request with respect to the low-latency service 2 to the low-latency BS5 706*e*. Herein, the service request may include T_UE_ID of the low-latency UE 702*e* and information indicating a service name corresponding to the low-latency service 2.

Then, in operation 748, the low-latency BS5 706*e* performs a low-latency context update procedure for requesting and obtaining a low-latency context of from the low-latency BS3 706*c*, which has performed SC with respect to the low-latency UE 702*e* last. Herein, the low-latency BS5 706*e* obtains, through the service request, information of the low-latency BS3 706*c* which has performed SC with respect to the low-latency UE 702*e* last. More specifically, the service request may include cell information for which the low-latency UE performs SAU, e.g., cell ID. Then, the low-latency BS5 706*e* recognizes, based on cell ID, information of the low-latency BS3 706*c* which has performed SC with respect to the low-latency UE 702*e* last. The low-latency BS5 706*e* recognizes, based on the low-latency context, that the low-latency service 1 to be provided to the low-latency UE 702*e* is an MT support service. In operation 750, the low-latency BS5 706*e* configures an F2 bearer with a low-latency BS server corresponding to each of the low-latency service 1 and a newly service-requested low-latency service 2. Thus, a service use state 708*e* of the low-latency UE 702*e* includes a current mode set to the connected mode, an on-going service list including the low-latency services 1 and 2, and an available service list including the low-latency services 1 through 3. The low-latency BS5 706*e* performs both the PC function and the SC function for providing the low-latency services 1 and 2 with respect to the low-latency UE 702*e*.

Figure 8:
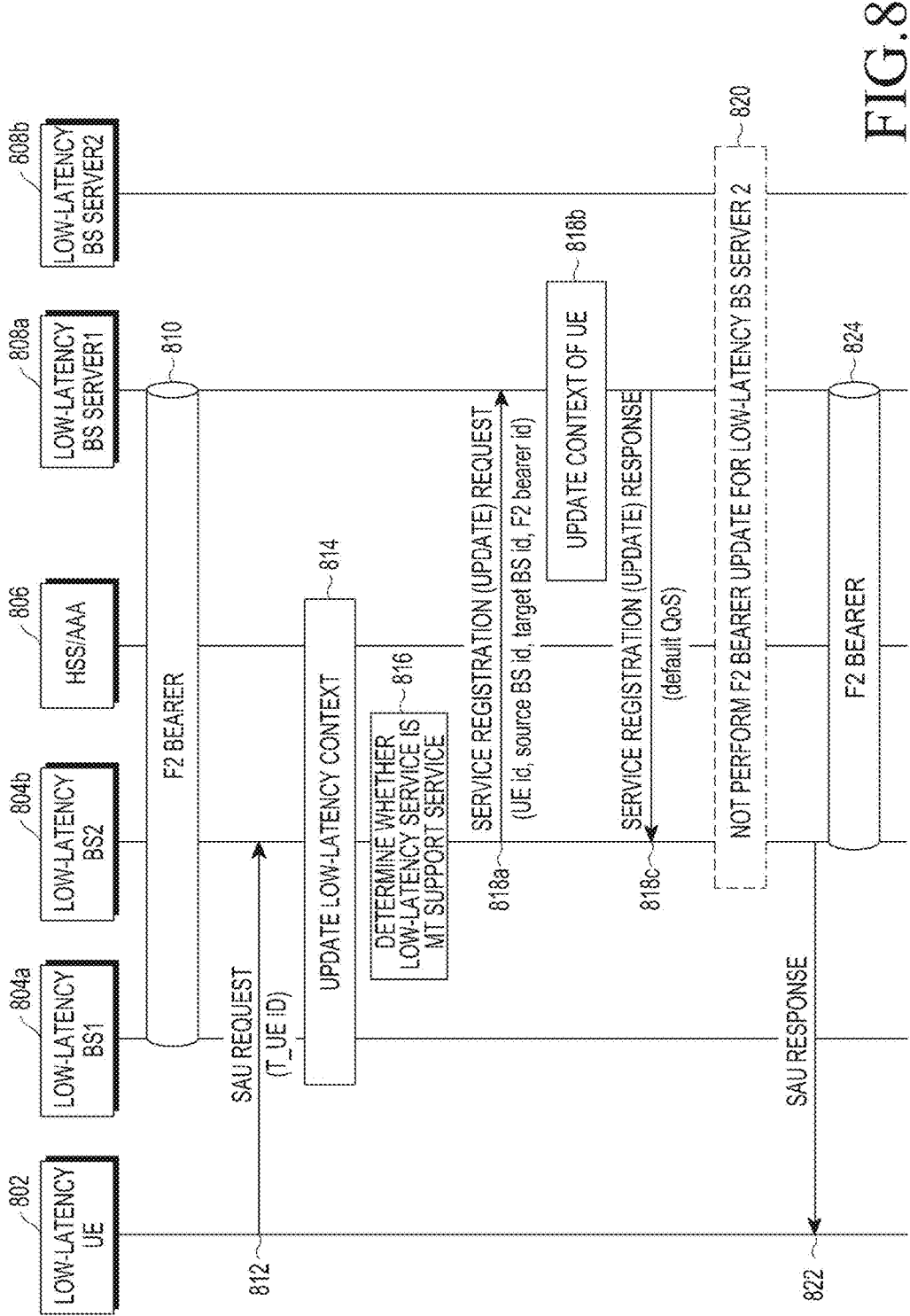
FIG. 8 is a ladder diagram illustrating an SAU operation according to an embodiment of the present disclosure.

FIG. 8 is a ladder diagram illustrating an SAU operation according to an embodiment of the present disclosure.

Referring to FIG. 8, in operation 810, as a low-latency BS1 804*a* configures an F2 bearer with a low-latency BS server1 808*a* that provides the low-latency service 1, a low-latency UE 802 is being provided with the low-latency service 1 through the low-latency BS1 804*a*. Herein, it is assumed that the low-latency service 1 is an MT support service and as the low-latency UE 802 switches to the idle mode, the low-latency UE 802 configures an on-going list with the low-latency service 1. Although not shown in FIG. 8, as the low-latency UE 802 moves to a coverage of a low-latency BS2 804*b*, the low-latency UE 802 obtains a support service list of the low-latency BS2 804*b* through system information, e.g., an SIB, broadcast from the low-latency BS2 804*b*. Herein, the support service list is assumed to include the low-latency services 1 and 2. The low-latency UE 802 recognizes that the low-latency service 1, which is an on-going service supported through the low-latency BS2 804, is an MT support service. Thus, in operation 812, the low-latency UE 802 forwards an SAU request including its T_UE_ID to a low-latency BS2 804*b*.

Then, in operation 814, the low-latency BS2 804*b* requests a low-latency context of the low-latency UE 802 from the low-latency BS1 804*a* to obtain and activate the context. According to an embodiment, the low-latency context may be obtained through the HSS/AAA or the MME. In operation 816, the low-latency BS2 804*b* determines, based on the obtained low-latency context, whether the low-latency service 1 to be provided to the low-latency UE 802 is an MT support service. If determining that the low-latency service 1 is an MT support service, the low-latency BS2 804*b* forwards a service registration (update) request to a low-latency BS server1 808*a* that provides the low-latency service 1 in operation 818*a*. Herein, the service registration (update) request may include a low-latency context, such as T_UE_ID of the low-latency UE 802, ID of a previous serving BS, the low-latency BS1 804*a*, ID of the low-latency BS2 804*b*, ID for F2 bearer configuration, and so forth. In operation 818*b*, the low-latency BS server1 808*a* updates the low-latency context of the low-latency UE 804*a* based on the low-latency context obtained from the service request, and performs service registration or update with respect to the low-latency service 1. In operation 818*c*, the low-latency BS server1 808*a* notifies the low-latency BS2 804*b* of completion of the service registration or update. Herein, the notification may include a default QoS of the F2 bearer configured for the low-latency service 1.

The low-latency BS2 804*b* may provide a low-latency service 2 through a low-latency BS server2 808*b*, but if the low-latency service 2 is an MT-non-support service in spite of being included in the on-going service list of the low-latency UE 802, the F2 bearer is not configured as in operation 820. In operation 822, the low-latency BS2 804*b* forwards a response to the low-latency UE 802 to notify completion of SAU with respect to the low-latency service 1. Then, in operation 824, the low-latency BS2 804*b* configures the F2 bearer with the low-latency BS server1 808*a* to provide an MT service of the low-latency service 1 to the low-latency UE 802.

Fifth Embodiment (Method for Providing an MT Signal to a Low-Latency UE)

Figure 9A:
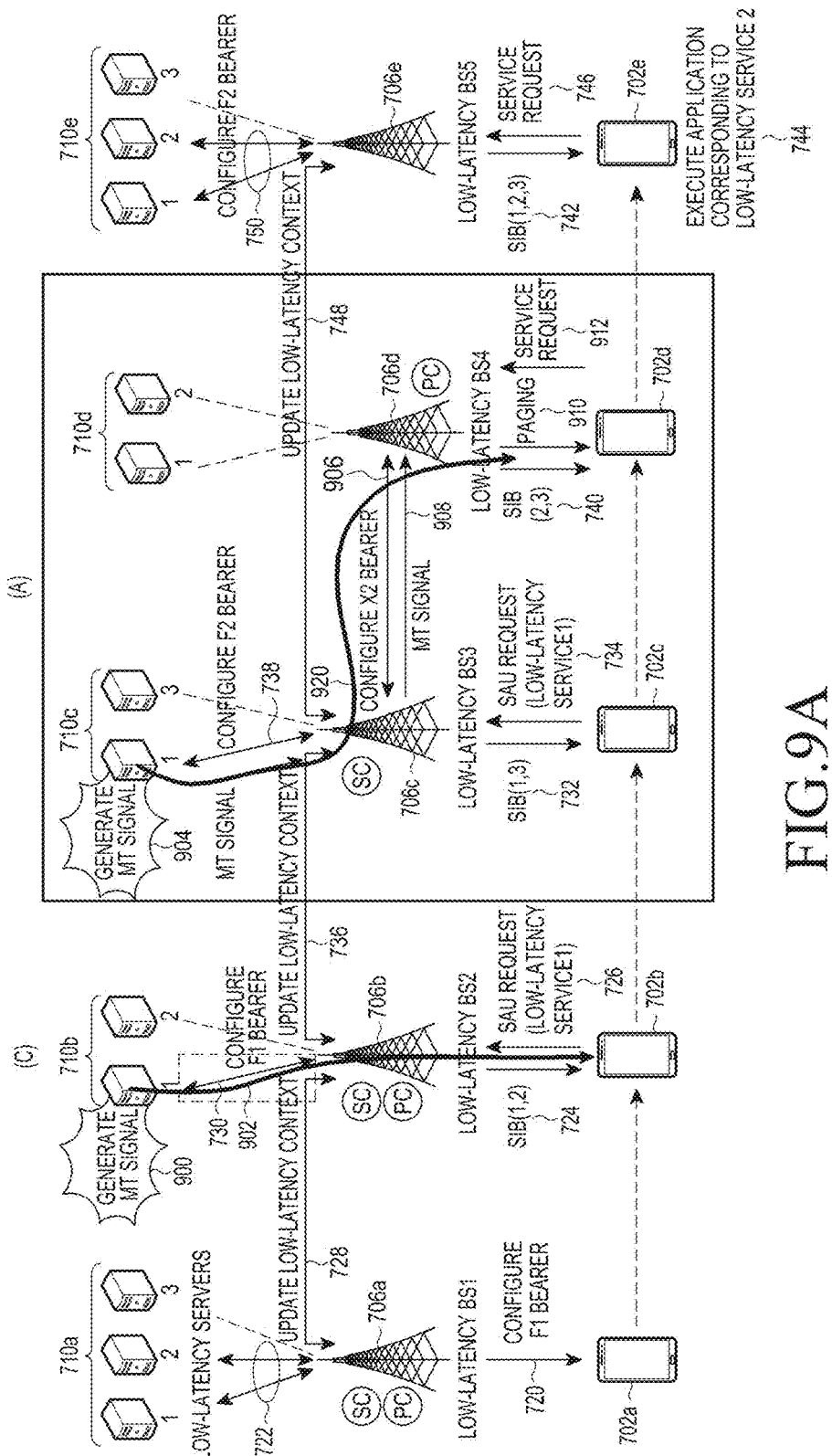
FIG. 9A illustrates an example of a situation where a low-latency UE receives an MT signal according to a fourth embodiment of the present disclosure.

FIG. 9A illustrates an example of a situation where a low-latency UE receives an MT signal according to a fourth embodiment of the present disclosure. With reference to FIG. 9, a description will be made of an operation of forwarding an MT signal to a low-latency UE in five moving situations of a low-latency UE described with reference to FIG. 7B for convenience. Thus, a service use state provided to a low-latency UE through a low-latency BS according to movement of each low-latency UE is the same as described with reference to FIG. 7B, and thus will not be described.

Referring to FIG. 9A, in the situation C, after the low-latency UE 702*b* moves to the coverage of the low-latency BS2 706*b*, the low-latency BS2 706*b* performs both the SC function and the PC function with respect to the low-latency UE 702*b* in response to the SAU request of the low-latency UE 702*b* sent in operation 726. In operation 900, assuming that the low-latency BS servers 910*b* generate an MT signal for the low-latency service 1, the MT signal is forwarded to the low-latency BS2 706*b* through the F2 bearer configured in operations 724 through 730 of FIG. 7B. The low-latency BS2 forwards the MT signal to a low-latency UE 902*b* through the F1 bearer, which is a radio link configured through paging. Thus, a path 902 of the MT signal generated in the low-latency BS servers 910*b* is configured through the F2 bearer configured with the low-latency BS2 706*b* and the F1 bearer configured between the low-latency BS2 706*b* and the low-latency UE 702*b*.

Figure 9B:
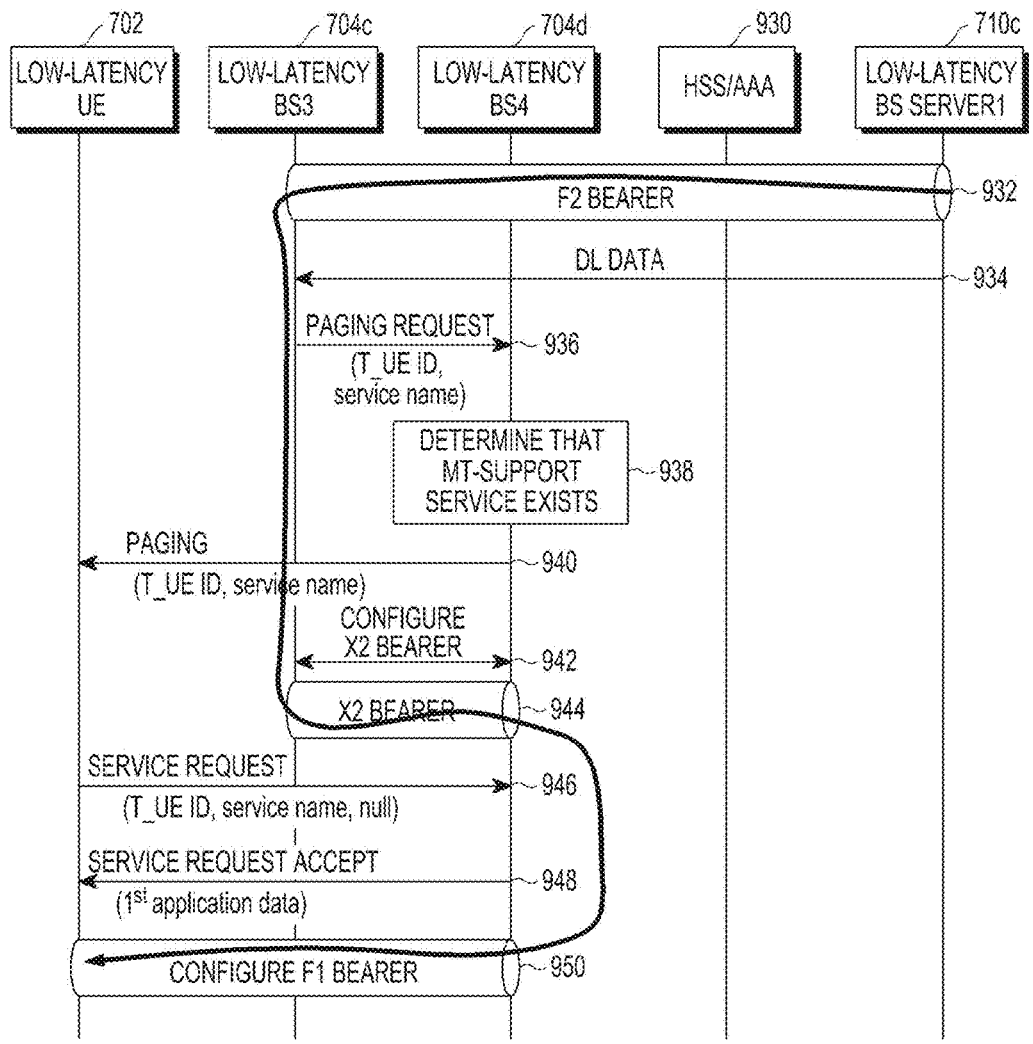
FIG. 9B is a ladder diagram illustrating an operation where a low-latency UE 702*d* of FIG. 9A receives an MT signal through a low-latency BS4 706*d*.

Next, in the situation A, although the low-latency UE 704*c* moves to the coverage of the low-latency BS4 706*d*, the low-latency BS4 706*d* is assumed to perform only the PC function with respect to the low-latency UE 702*d* as the low-latency BS4 706*d* does not support the low-latency service 1 included in the on-going service list of the low-latency UE 702*d*. Thus, the low-latency BS3 706*c* performs the SC function for providing the low-latency service 1 with respect to the low-latency UE 702*d*. In this state, the low-latency BS servers 710*c* are assumed to generate the MT signal for the low-latency service 1 in operation 904. Then, in operation 906, the low-latency BS4 706*d* configures an X2 bearer with the low-latency BS3 706*c*. The low-latency BS3 706*c* recognizes that the low-latency UE 702*d* is located in the coverage of the low-latency BS4 706*d* because of performing location registration when the low-latency UE 702*d* enters the coverage where the PC function of the low-latency BS4 706*d* is performed. Herein, X2 bearer configuration and location registration may be performed similarly with location registration of an existing system, e.g., TAU of the LTE system as described above. The low-latency BS3 706*c* and the low-latency BS4 706*d* update the low-latency context of the low-latency UE 702*d* as in operation 736 of FIG. 7A. Then, in operation 908, the low-latency BS3 706*c* forwards the generated MT signal to the low-latency BS4 706*d*. In operation 910, the low-latency BS4 706*d* forwards a paging signal to its coverage. In operation 912, the low-latency UE 702*d* forwards a service request to the low-latency BS4 706*d* to configure the radio link, the F1 bearer, with the low-latency BS4 706*d*. As a result, the path 920 of the MT signal generated in the low-latency BS servers 710*c* is configured through the F2 bearer configured with the low-latency BS3 706*c*, the X2 bearer configured between the low-latency BS3 706*c* and the low-latency BS4 706*d*, and the F1 bearer configured between the low-latency BS4 706*d* and the low-latency UE 702*b*. FIG. 9B is a ladder diagram illustrating an operation where the low-latency UE 702*d* of FIG. 9A receives an MT signal through the low-latency BS4 706*d*.

Referring to FIG. 9B, in operation 932, the low-latency BS3 706*c* has the F2 bearer configured with the low-latency BS server1 710*c* that provides the low-latency service 1 supporting the MT support service among on-going services of the low-latency UE 702 through the operations described with reference to FIG. 7B. Once the MT signal for the low-latency service 1 is generated, the low-latency BS server1 710*c* forwards the MT signal to the low-latency BS3 704*c* through the F2 bearer in operation 934. Then, in operation 936, the low-latency BS3 706*c* forwards a paging request to the low-latency BS4 704*d*. The paging request may include T_UE_ID of the low-latency UE 702 and information indicating a service name corresponding to the low-latency service 1. In operation 938, the low-latency BS4 706*d* determines from a service name obtained from the paging request that the low-latency service 1 is an MT support service. Then, in operation 940, the low-latency BS4 706*d* sends a paging signal for configuring the radio link, the F1 bearer, with the low-latency UE 702*d* to the low-latency UE 702*d*. In operation 942, the low-latency BS4 706*d* configures an X2 bearer with the low-latency BS3 706*c* for sending the MT signal. In operation 946, the low-latency UE 702 forwards a service request for configuring the radio link, i.e., the F1 bearer, with the low-latency BS4 706*d*. The paging request may include T_UE_ID of the low-latency UE 702*d* and information indicating a service name corresponding to the low-latency service 1. The low-latency BS4 706*d* configures the F1 bearer with the low-latency UE 702*d* and then forwards a response to the service request to the low-latency UE 702*d* in operation 948. In operation 950, the low-latency BS4 704*d* transmits downlink (DL) data for the low-latency service 1 to the low-latency UE 702 through the F1 bearer.

Figure 10A:
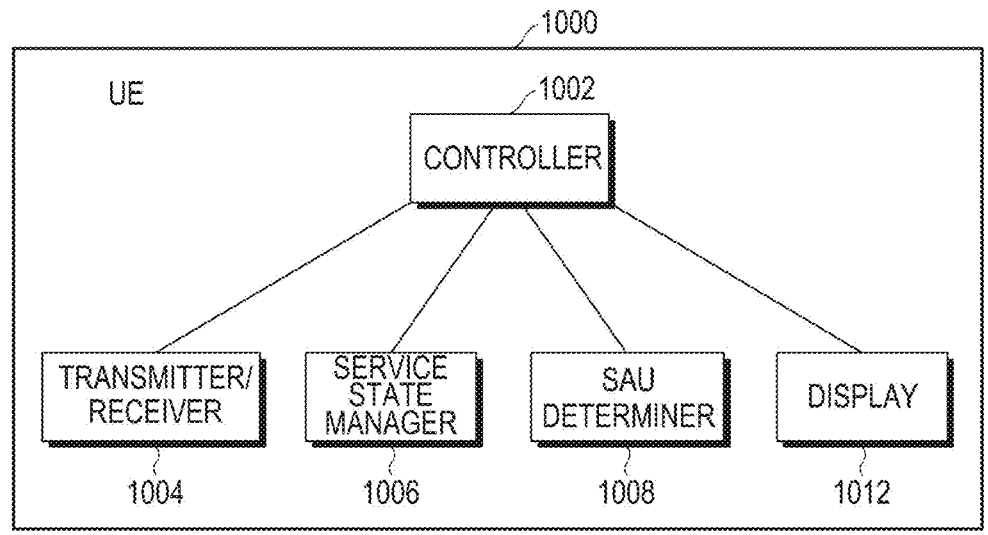
FIG. 10A is a block diagram of a low-latency UE according to an embodiment of the present disclosure.

FIG. 10A is a block diagram of a low-latency UE according to an embodiment of the present disclosure.

Referring to FIG. 10A, a low-latency UE 1000 according to an embodiment of the present disclosure may include a controller 1002, a transmitter/receiver 1004, a service state manager 1006, an SAU determiner 1008, and a display 1012. The above-described structure of the low-latency UE 1000 is an example, and elements of the UE may be divided into sub-units or integrated into one structure depending on operator's intention or embodiments.

The transmitter/receiver 1004 may receive information for determining whether a low-latency service is an MT support service under control of the controller 1002 according to the first embodiment of the present disclosure. A detailed description thereof may be the same as that of the first embodiment and thus will not be provided. The transmitter/receiver 1004 may also receive system information from a low-latency BS to which the low-latency UE 1000 is newly attached as the low-latency UE 1000 moves. The system information may include a support service list of the low-latency BS, MT support indication information for each low-latency service included in the list, and so forth. The transmitter/receiver 1004 may receive an MT signal provided according to the fifth embodiment described with reference to FIGS. 9A and 9B under control of the controller 1002.

The service state manager 1006 manages an available service list, an on-going service list, and so forth based on the support service list, etc., received by the transmitter/receiver 1004 under control of the controller 1002. The service state manager 1006 operates as described with reference to FIG. 5 according to the second embodiment, and the service state manager 1006 manages a service use state per low-latency UE as described with reference to FIGS. 7A and 7B.

The SAU determiner 1008 determines whether to perform SAU based on a service providing state of a low-latency BS the low-latency UE enters according to the fourth embodiment of the present disclosure.

The display 1012 displays the available service list to a user and receives an execution instruction for a low-latency service or detailed contents thereof from the user under control of the controller 1002, as shown in FIGS. 11A through 11E and 12 to be described below.

Figure 10B:
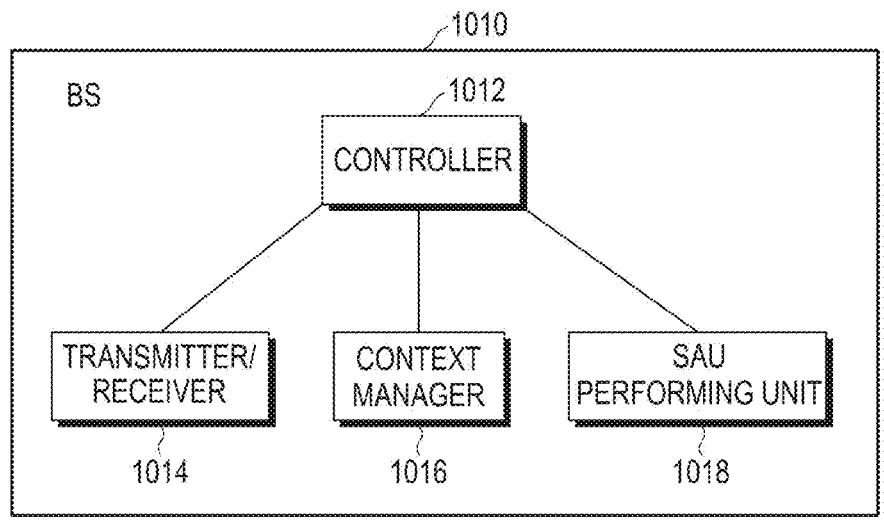
FIG. 10B is a block diagram of a low-latency BS according to an embodiment of the present disclosure.

FIG. 10B is a block diagram of a low-latency BS according to an embodiment of the present disclosure.

Referring to FIG. 10B, a low-latency BS 1010 may include a controller 1012, a transmitter/receiver 1014, a context manager 1016, and an SAU performing unit 108. The above-described structure of the low-latency BS 1010 is an example, and elements of the BS may be divided into sub-units or integrated into one structure depending on operator's intention or embodiments. The context manager 1016 manages a low-latency context of the low-latency UE according to the second embodiment of the present disclosure under control of the controller 1012. The context manager 1016 operates as described with reference to FIGS. 3A and 3B and FIGS. 4A through 4C, and thus will not be described again. Once the transmitter/receiver 1014 receives an SAU request from a low-latency UE attached to the low-latency BS 1010, the controller 1012 controls the SAU performing unit 108 to perform SAU according to the fourth embodiment of the present disclosure. The controller 1012 then controls the transmitter/receiver 1014 to forward a generated MT signal to the low-latency UE according to the fifth embodiment of the present disclosure. Operations of elements of the low-latency BS 1010 correspond to the above description of the embodiments and thus will not be described in detail.

Meanwhile, a low-latency service according to an embodiment of the present disclosure has a high transmission speed and an ultra-low latency (LCC). Thus, an operator may set a lower billing level than general Internet services when providing the low-latency service. Thus, a low-latency UE according to an embodiment of the present disclosure notifies available low-latency services to users and requests the users to select a low-latency service to be executed. Upon receiving system information from a low-latency BS to which the low-latency UE is newly attached as the low-latency UE moves, the low-latency UE according to an embodiment of the present disclosure updates an available service list as described with reference to FIG. 5. In this case, the low-latency UE may indicate update of the available service list to the user through vibration, sound, a popup window, etc. The indication may provide a user input window for checking details information of updated low-latency services as well as indicating the update of the available service list.

FIGS. 11A through 11E illustrate examples of a display screen on which available low-latency services are provided to a user according to an embodiment of the present disclosure.

Figure 11A:
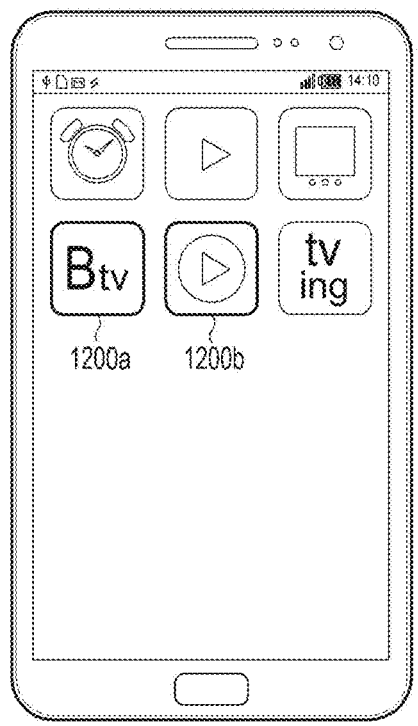
FIGS. 11A through 11E illustrate examples of a display screen on which available low-latency services are provided to a user according to an embodiment of the present disclosure.
Figure 11B:
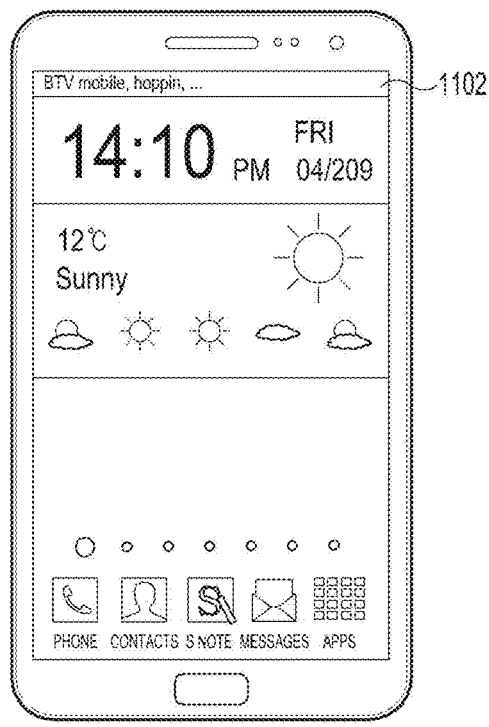
Figure 11C:
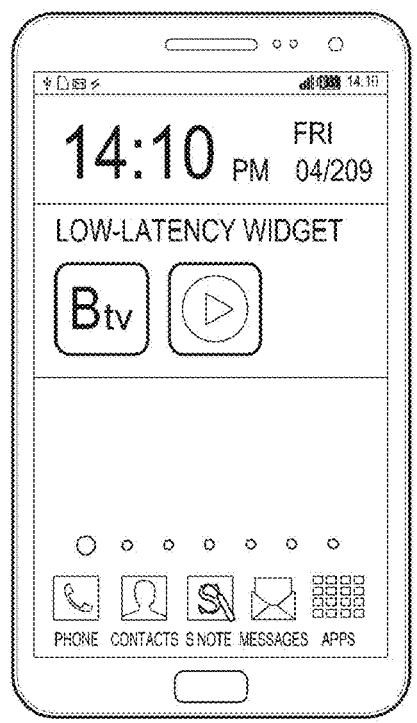
Figure 11D:
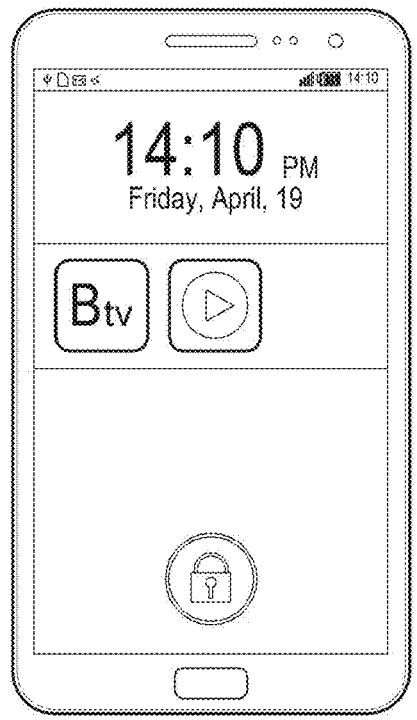
Figure 11E:
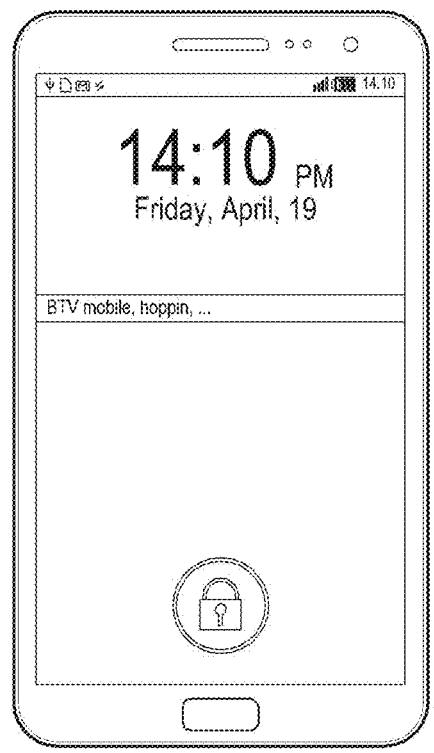

In FIG. 11A, icons supporting a low-latency service among icons arranged on a menu screen of a low-latency UE are displayed by highlighted indications such as bold borders, etc., as indicated by 1200*a* and 1200*b*. According to another embodiment, a special character or shape, etc., indicating support for a low-latency service may be indicated overlappingly on contents. In FIG. 11B, contents supporting a low-latency service may be listed in the form of a status bar 1102 on the top of an idle screen of the low-latency UE. As illustrated in FIG. 11C, contents supporting a low-latency service may be separately displayed as widgets in the form of icons or texts in the middle of the idle screen. In FIG. 11D, contents supporting a low-latency service are provided in the form of icons on a lock screen; in FIG. 11E, contents supporting a low-latency service are provided in the form of texts on the lock screen.

FIGS. 12A-D illustrate examples of a screen on which content corresponding to a user-selected low-latency service is executed according to an embodiment of the present disclosure.

On a lock screen illustrated in FIG. 12A, a user is assumed to select low-latency service contents corresponding to ultra-high definition (UHD) video streaming as indicated by 1200. Then, a display screen of a low-latency UE displays detailed contents of the selected contents to the user as indicated by 1202 in FIG. 12C. Once the user selects particular detailed contents, an execution screen of the detailed contents may be displayed as shown in FIG. 12D.

While embodiments of the present disclosure have been described, various changes may be made without departing the scope of the present disclosure. Therefore, the scope of the present disclosure should be defined by the appended claims and equivalents thereof, rather than by the described embodiments.

The method and apparatus for receiving an MT service by a mobile terminal in an idle mode in a communication system according to an embodiment of the present disclosure may be implemented by hardware, software, or a combination of hardware and software. Such arbitrary software may be stored, for example, in a volatile or non-volatile storage device (e.g., a read only memory (ROM), etc.), a memory (e.g., a random access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the graphic screen update method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

Moreover, in an embodiment of the present disclosure, in the communication system, the mobile terminal in the idle mode may receive and store the program from an apparatus for providing and receiving the MT service. The program providing device may include a memory for storing a program including instructions for instructing a graphic processing device to execute a preset method, information necessary for the method, a communication unit for performing wired or wireless communication with the graphic processing device, and a controller for transmitting a corresponding program to the graphic processing device at the request of the graphic processing device or automatically.

The invention claimed is:

1. A method for receiving a mobile terminated (MT) service by a user equipment (UE) in a communication system, the method comprising:
   determining based on a support service list received from a target base station (BS) whether a continuously available service exists among services provided from a serving BS; and
   sending a service area update (SAU) request to the target BS through an access layer, if the continuously available service supports the MT service when the continuously available service exists.

2. The method of claim 1, wherein the support service list comprises services provided by a low-latency BS server connected with the target BS and MT support indication information indicating whether each of the services supports an MT service.

3. The method of claim 1, further comprising obtaining from a low-latency BS server, information about whether the continuously available service supports an MT service,
   wherein the information about whether the continuously available service supports an MT service comprises an MT service list received in advance from an operator or MT support indication information mapped to each of the services included in the support service list.

4. The method of claim 1, further comprising updating an available service list of the UE based on the support service list.

5. The method of claim 2, further comprising avoiding sending the SAU request to the target BS and receiving data of the continuously available service, generated in the low-latency BS server, through the serving BS, if the continuously available service does not support the MT service or the continuously available service does not exist.

6. The method of claim 2, further comprising receiving an MT signal generated in the low-latency BS server through a first path, upon receiving a response message with respect to the SAU request from the target BS,
   wherein the first path comprises a core bearer configured between the target BS and the low-latency BS server and a radio bearer configured between the target BS and the UE.

7. A user equipment (UE) in a communication system, the UE comprising:
   a transceiver; and
   a processor configured to:
   determine based on a support service list received from a target base station (BS) whether a continuously available service exists among services provided from a serving BS; and
   control the transceiver to transmit a service area update (SAU) request to the target BS through an access layer, if the continuously available service supports a mobile terminated (MT) service when the continuously available service exists.

8. The UE of claim 7, wherein the support service list comprises services provided by a low-latency BS server connected with the target BS and MT support indication information indicating whether each of the services supports an MT service.

9. The UE of claim 7, wherein the processor is further configured to obtain, from a low-latency BS server, information about whether the continuously available service supports an MT service,
   wherein the information about whether the continuously available service supports an MT service comprises an MT service list received in advance from an operator or MT support indication information mapped to each of the services included in the support service list.

10. The UE of claim 7, wherein the processor is further configured to update an available service list of the UE based on the support service list.

11. The UE of claim 8, the processor is further configured to avoid transmitting the SAU request to the target BS and receiving data of the continuously available service, generated in the low-latency BS server, through the serving BS, if the continuously available service does not support the MT service or the continuously available service does not exist.

12. The UE of claim 8, wherein the processor is further configured to control the transceiver to receive an MT signal generated in the low-latency BS server through a first path, upon receiving a response message with respect to the SAU request from the target BS,
    wherein the first path comprises a core bearer configured between the target BS and the low-latency BS server and a radio bearer configured between the target BS and the UE.

\* \* \* \* \*